US012586182B2

(12) United States Patent
Hsiao et al.

(10) Patent No.: US 12,586,182 B2
(45) Date of Patent: Mar. 24, 2026

(54) MULTI-PRONG MULTITASK CONVOLUTIONAL NEURAL NETWORK FOR BIOMEDICAL IMAGE INFERENCE

(71) Applicant: The Regents of the University of California, Oakland, CA (US)

(72) Inventors: Albert Hsiao, San Diego, CA (US); Evan Masutani, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 632 days.

(21) Appl. No.: 17/984,146

(22) Filed: Nov. 9, 2022

(65) Prior Publication Data

US 2023/0147286 A1     May 11, 2023

Related U.S. Application Data

(60) Provisional application No. 63/277,569, filed on Nov. 9, 2021.

(51) Int. Cl.
| | |
|---|---|
| *G06K 9/00* | (2022.01) |
| *G06T 7/00* | (2017.01) |
| *G06T 7/10* | (2017.01) |
| *G06T 7/269* | (2017.01) |
| *G06V 10/771* | (2022.01) |
| *G06V 10/82* | (2022.01) |

(52) U.S. Cl.
CPC .............. *G06T 7/0012* (2013.01); *G06T 7/10* (2017.01); *G06T 7/269* (2017.01); *G06V 10/771* (2022.01); *G06V 10/82* (2022.01); *G06T 2207/30048* (2013.01)

(58) Field of Classification Search
CPC ........ G06T 7/0012; G06T 2207/30048; G06V 10/82
See application file for complete search history.

(56) References Cited

U.S. PATENT DOCUMENTS

| | | | |
|---|---|---|---|
| 9,513,357 | B2 | 12/2016 | Hsiao et al. |
| 10,698,061 | B2 | 6/2020 | Hsiao et al. |
| 10,909,681 | B2 | 2/2021 | Hsiao et al. |

(Continued)

OTHER PUBLICATIONS

Wang, C., MacGillivray, T., Macnaught, G., Yang, G., & Newby, D. (Sep. 2018). A two-stage U-net model for 3D multi-class segmentation on full-resolution cardiac data. In International Workshop on Statistical Atlases and Computational Models of the Heart (pp. 191-199). (Year: 2018).*

(Continued)

*Primary Examiner* — Molly Wilburn
*Assistant Examiner* — Aidan Keup
(74) *Attorney, Agent, or Firm* — Eleanor Musick; Torrey Pines Law Group PC

(57)     ABSTRACT

A neural network architecture and method for analysis of time series images from an image source employs a 3D-UNet convolutional neural network (CNN) configured to receive the time series images and generate spatiotemporal feature maps therefrom. Multiple sub-convolutional neural network output prongs based on an SRNet architecture receive the feature maps and simultaneously generate inferences for image segmentation, regression of values, and multi-landmark localization.

18 Claims, 14 Drawing Sheets
(6 of 14 Drawing Sheet(s) Filed in Color)

(56) References Cited

U.S. PATENT DOCUMENTS

| | | |
|---|---|---|
| 2016/0338613 A1 | 11/2016 | Beckers et al. |
| 2018/0256042 A1 | 9/2018 | Beckers et al. |
| 2022/0114699 A1 | 4/2022 | Hsiao et al. |
| 2022/0261991 A1 | 8/2022 | Hsiao et al. |

OTHER PUBLICATIONS

Santos, J. E., Yin, Y., Jo, H., Pan, W., Kang, Q., Viswanathan, H. S., . . . & Lubbers, N. (2021). Computationally efficient multiscale neural networks applied to fluid flow in complex 3D porous media. Transport in porous media, 140(1), 241-272. (Year: 2021).*
Hu, J., Shen, L., & Sun, G. (2018). Squeeze-and-excitation networks. In Proceedings of the IEEE conference on computer vision and pattern recognition (pp. 7132-7141). (Year: 2018).*
Bahrami, N., Automated Selection of Myocardial Inversion Time with a Convolutional Neural Network: Spatial Temporal Ensemble Myocardium Inversion NETwork (STEMI-NET), HHS Public Access, Magn. Reson. Med. Author manuscript, May 2019, pp. 1-16.
Blansit, K. et al., Deep Learning-based Prescription of Cardiac MRI Planes, Radiology: Artificial Intelligence, 2019, pp. 1-8, vol. 1.
Morales, M., et al., DeepStrain: A Deep Learning Workflow for the Automated Characterization of Cardiac Mechanics, Frontiers in Cardiovascular Medicine, pp. 1-16, Sep. 2021, vol. 8.

* cited by examiner

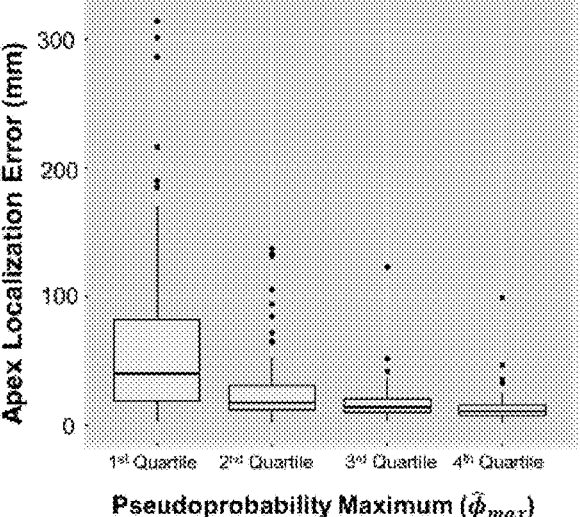
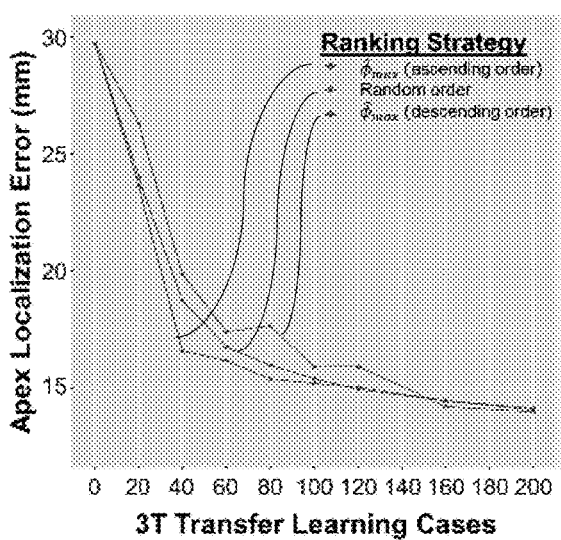
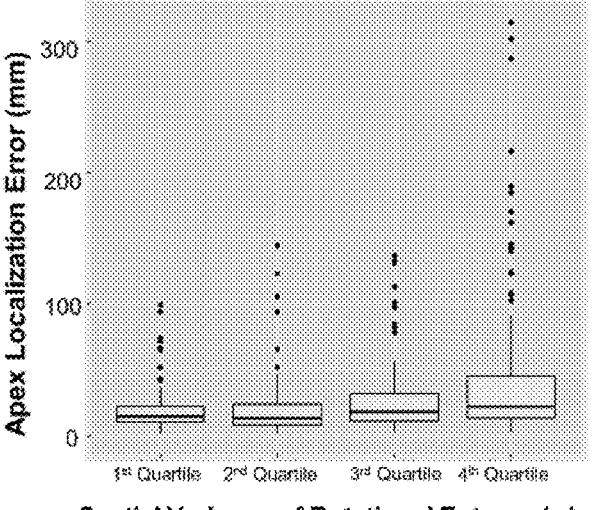
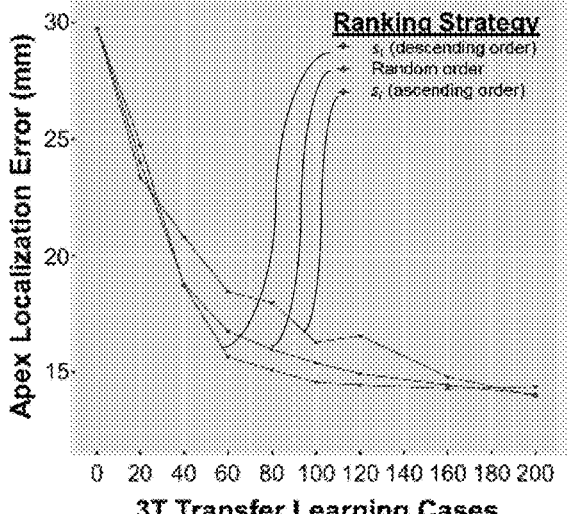
FIG. 3

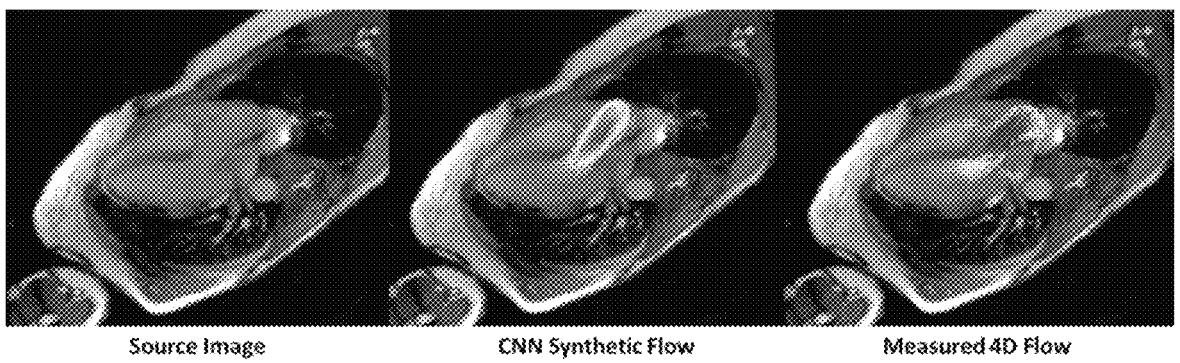
Source Image          CNN Synthetic Flow          Measured 4D Flow
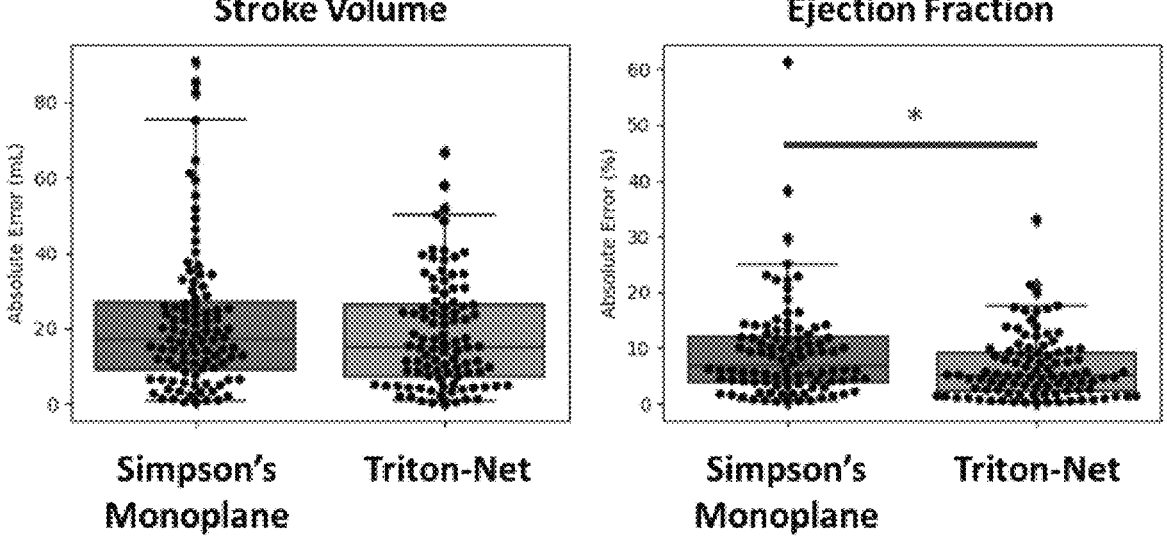
FIG. 5

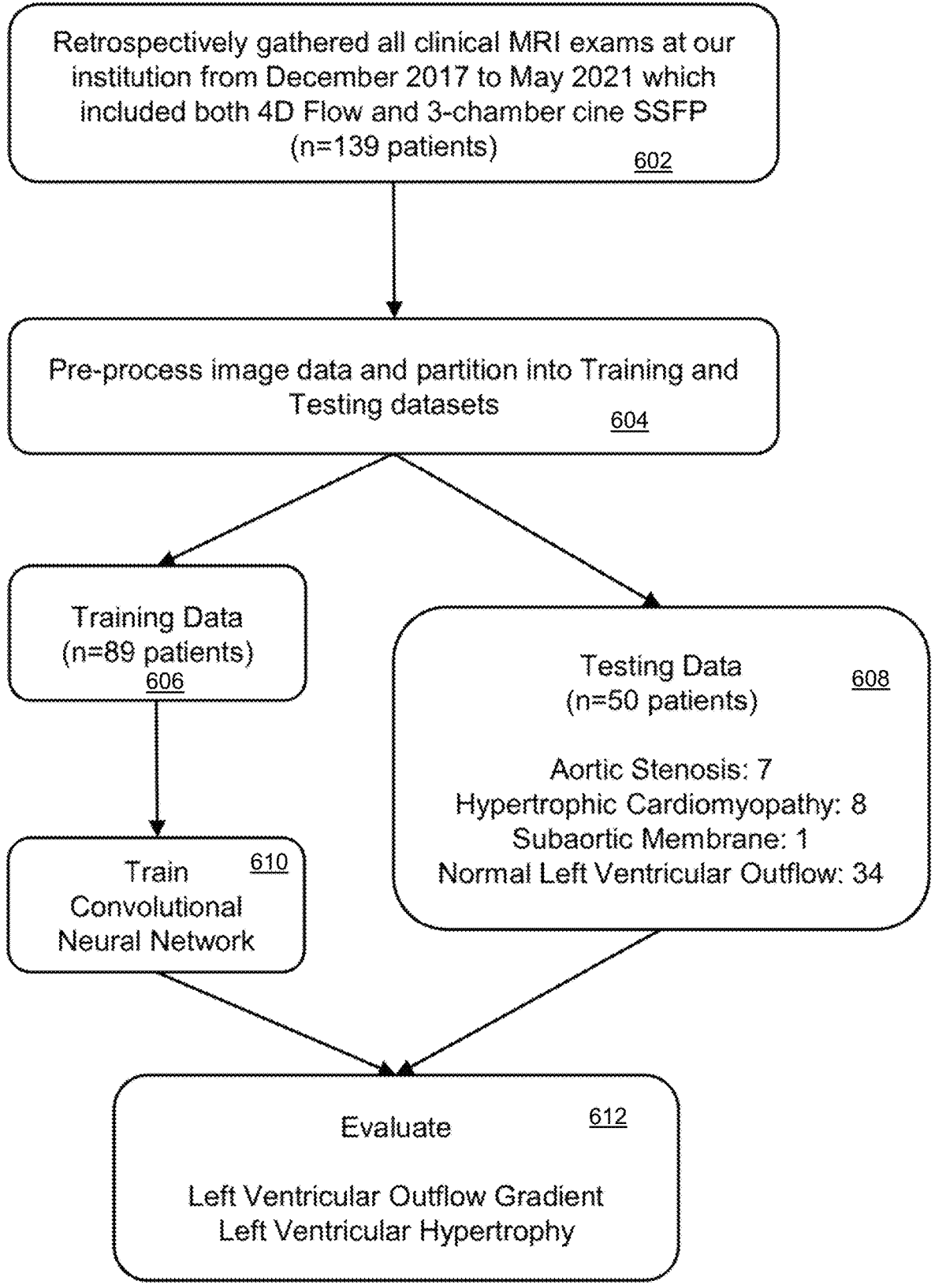

Retrospectively gathered all clinical MRI exams at our institution from December 2017 to May 2021 which included both 4D Flow and 3-chamber cine SSFP (n=139 patients) 602

Pre-process image data and partition into Training and Testing datasets 604

Training Data (n=89 patients) 606

Testing Data 608
(n=50 patients)

Aortic Stenosis: 7
Hypertrophic Cardiomyopathy: 8
Subaortic Membrane: 1
Normal Left Ventricular Outflow: 34

Train 610
Convolutional
Neural Network

Evaluate 612

Left Ventricular Outflow Gradient
Left Ventricular Hypertrophy

FIG. 6

Source Image　　　Inferred　　　Ground Truth

MULTI-PRONG MULTITASK CONVOLUTIONAL NEURAL NETWORK FOR BIOMEDICAL IMAGE INFERENCE

RELATED APPLICATIONS

This application claims the benefit of the priority of Provisional Application No. 63/277,569, filed Nov. 9, 2021, which is incorporated herein by reference in its entirety.

FIELD OF THE INVENTION

The present invention is related to a system and method for analysis of biomedical images using convolutional neural networks (CNNs), and more particularly to a hybrid CNN for simultaneous localization, segmentation, and synthesis of objects in the image.

BACKGROUND

Convolutional neural networks (CNNs) are quickly becoming key tools for extraction of the vast information contained within medical images. Their emergence has reawakened the larger field of machine learning and computer vision due to their effectiveness and ability to learn without explicit programming. However, a core problem with widespread adoption of machine learning for medical image analysis is that performance in the clinical environment may not match the laboratory due to technical variations, uncommon diseases, and technological change. Furthermore, CNNs vary in "explainability", which is essential if they are used to manage individual patients. The long-term goal is to develop CNN architectures that overcome these key challenges.

CNNs can be broadly divided into algorithms that perform image-wide classification or pixel-wise segmentation. The former learns from large numbers of whole-image labels, while the latter learns pixel-wise detail through expert delineation of findings. The former relies less on expert supervision, while the latter can be guided to learn with relatively few examples. Data for training image-wide classification algorithms is readily generated, and thus have become popular for initial investigation. However, an important limitation of classification CNNs is lack of inherent explainability, which can limit clinical utility. Previous groups largely focused on classification CNNs to enhance diagnostic interpretation in x-ray and more recently applied these to assessment of COVID-19 disease severity. These image-wide classification benefit from availability of training data, and do not need granular pixel-wise image annotation. However, they tend to have greater difficulty with subtle but clinically consequential findings.

In contrast to classification CNNs, pixel-wise image segmentation CNNs including U-Net, produce image results that are readily explainable. Segmentation CNNs have been shown to be powerful for delineation of cardiac contours for quantification of cardiac function. These have been adapted to automate prescription of imaging planes for cardiac MRI. Because these CNNs generate image outputs, unlike classification CNNs, they are readily amenable to human supervision.

An important area in need of improvement in medical image analysis is cardiac MRI, a versatile imaging technique for assessment of anatomy and function. Cine balanced steady-state free precession (SSFP) forms the backbone of cardiac MRI and is the standard for quantification of cardiac function and morphology. Over the last several years, convolutional neural networks (CNNs) have proven valuable for automating multiple visual tasks, including segmentation of localization of anatomic landmarks and cardiac chambers, and are progressively being integrated into clinical workflows. Multiple groups have shown that CNNs can approach radiologist-level performance for ventricular segmentation and landmark localization. While there has been significant progress for these visual tasks, CNNs have untapped potential to extrapolate beyond structural identification. Recent work has hinted at the ability of CNNs to learn dynamic features to perform more complex tasks such as direct regression of ventricular function, synthesis of high frequency spatial information, and computation of pixel image velocimetry. The super-resolution technique disclosed in U.S. Patent Publication No. 2022/0114699 (incorporated herein by reference), accomplishes image synthesis tasks in isolation, without the benefit of the other concurrent tasks. In view of the effectiveness of this approach, it appears feasible to utilize a single architecture that is concurrently trained to perform image synthesis along with segmentation and classification should to perform multiple tasks. Interestingly, there has been little effort directed to development of concurrent segmentation and classification CNNs as they are considered dichotomous lines of investigation. The present approach is directed to accomplish all these tasks in a single architecture.

SUMMARY

The inventive approach disclosed herein, referred to by the name "Triton-Net," employs a hybrid, multi-pronged CNN architecture designed to concurrently perform disparate tasks to enhance the diagnostic value of medical images, In an illustrative three-pronged embodiment, three different tasks are performed: 1) regression of values, e.g., ejection fraction; 2) segmentation, e.g., delineation of the edges of cardiac chambers; and 3) image synthesis, e.g., inference of new knowledge in the form of an image. This approach is innovative by virtue of its non-intuitive combination of these disparate architectures to address both algorithm explainability and plasticity.

The inventive approach enables automated measurement from medical images while providing visual cues for the reliability of the algorithm for each case, providing additional inferences that are not readily carried out by humans. An example application is enhancing image quality or spontaneously generating a blood flow field within the heart.

The inventive hybrid CNN architecture is engineered for continuous learning and explainability, transparently and visually revealing its rationale while immediately providing direct application to benefit patients undergoing diagnostic imaging with cardiovascular and pulmonary disease.

While specific examples are described herein, Triton-Net's hybrid CNN architecture will be generally applicable to many medical imaging problems where quantification of objects on the image or enhancement of image detail are valuable. Applications of the inventive approach include enhancement of biomedical images, automated measurement from biomedical images, explainable AI, quantification of cardiac function from medical images, visualization of blood flow fields from CT, echo, or MRI, and more.

In one aspect of the invention, a neural network architecture for analysis of time series images from an image source includes a 3D-UNet convolutional neural network (CNN) configured to receive the time series images and generate spatiotemporal feature maps therefrom; and multiple sub-convolutional neural network output prongs based on an SRNet architecture configured to receive the feature maps and simultaneously generate a plurality of inferences including image segmentation, regression of values, and multi-landmark localization. The 3D-UNet architecture includes a 3D encoder-decoder block, a 3D-to-2D convolutional block, and a resolution scaling layer. Each output prong may include a squeeze-and-excitation block and a 2D convolution block.

In an exemplary implementation of the neural network architecture, the time series images comprise a cine balanced steady-state free precession (SSFP) cardiac series, the multiple sub-convolutional neural network output prongs comprise three prongs, and wherein image segmentation comprises delineating edges of cardiac chambers, regression of values comprises synthesis of blood flow field, and multi-landmark localization comprises localization of valves and apex. The architecture may further include a post-processing block configured combine inferences image segmentation, regression of values, and multi-landmark localization inference and to compute estimates for one or more of outflow gradients and maximum wall thickness. Estimates of outflow gradients, for example, may be calculated using the modified Bernoulli equation, $\Delta P=4v2$, where v is the peak speed. Estimates of maximum wall thickness may be calculated by defining a mitral valve-apex axis and slicing an end-diastolic myocardial mask orthogonally to the axis.

The neural network architecture may further include a post-processing block configured for computing a spatial gradient of the myocardial velocity field to determine a myocardial strain rate. The post-processing block may further calculate strain by temporally integrating the strain rate.

In another aspect of the invention, a method for analysis of time series images includes: receiving the time series images in a computer processor configured for executing a trained 3D-UNet convolutional neural network (CNN) and generating spatiotemporal feature maps therefrom; and distributing the feature maps to a plurality of sub-convolutional neural network output prongs based on an SRNet architecture for simultaneously generating inferences, wherein a first prong of the plurality generates inferences for image segmentation, a second prong generates inferences for regression of values, and a third prong generates inferences for multi-landmark localization. The 3D-UNet architecture may include a 3D encoder-decoder block, a 3D-to-2D convolutional block, and a resolution scaling layer. Each output prong may include a squeeze-and-excitation block and a 2D convolution block.

In an exemplary implementation of the method, the time series images comprise a cine balanced steady-state free precession (SSFP) cardiac series and wherein image segmentation comprises delineating edges of cardiac chambers, regression of values comprises synthesis of blood flow field, and multi-landmark localization comprises localization of valves and apex. The architecture may further include a post-processing block configured combine inferences image segmentation, regression of values, and multi-landmark localization inference and to compute estimates for one or more of outflow gradients and maximum wall thickness. Estimates of outflow gradients may be calculated using the modified Bernoulli equation, $\Delta P=4v2$, where v is the peak speed. Estimates of maximum wall thickness may be calculated by defining a mitral valve-apex axis and slicing an end-diastolic myocardial mask orthogonally to the axis.

The method may further include post-processing to compute a spatial gradient of the myocardial velocity field to determine a myocardial strain rate. The post-processing may further calculate strain by temporally integrating the strain rate.

The hybrid multitask CNNs disclosed herein overcome current limitations of traditional classification and segmentation CNN architectures, providing a powerful technology for routine clinical use.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 plots preliminary results of an active learning strategy on the efficiency of CNN transfer learning showing apex localization error for different uncertainty metrics.

FIG. 5 shows preliminary results of automated synthesis of blood flow fields (stroke volume and ejection fraction) produced by the inventive Triton-Net-Flow hybrid architecture.

FIG. 6 is a flow diagram of an exemplary process for training and testing the inventive hybrid CNN architecture for inferring cardiovascular fluid-mechanical relationships from routine cardiac MR images.

FIGS. 8B and 8C are plots of DICE and distance, respectively.

DETAILED DESCRIPTION OF EMBODIMENTS

Figure 1:
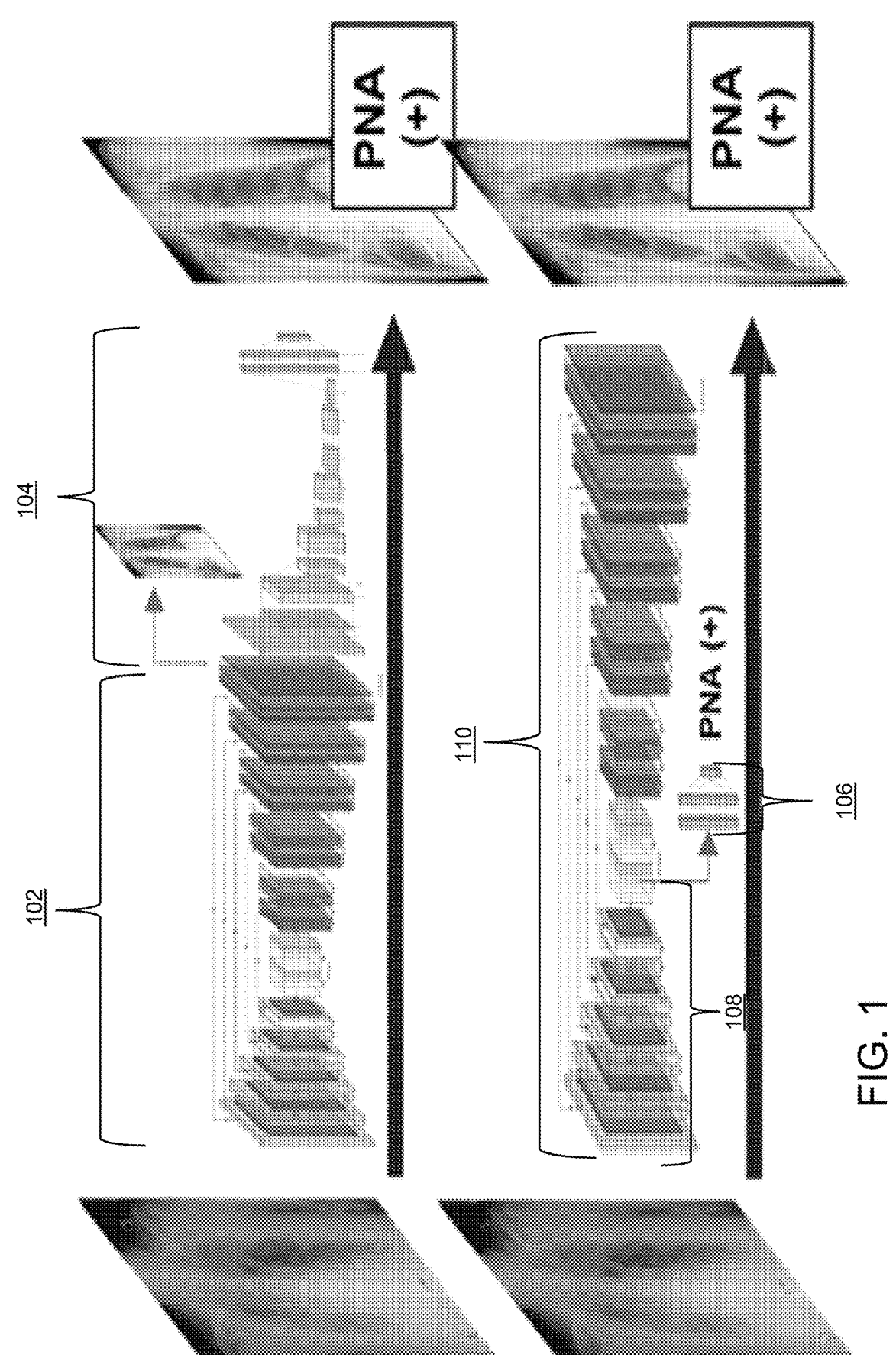
FIG. 1 is a diagram of an exemplary hybrid multitask CNN architecture for concurrently accomplishing image-wide classification/regression and pixel-wise segmentation/augmentation.

Development and evaluation of the inventive approach followed a step-wise approach. The first step evaluated the ability of a novel hybrid CNN architecture to solve the clinical challenge of detecting and quantifying severity of pneumonia on x-ray. X-ray is a widely prevalent modality, but challenging for humans to reliably interpret, particularly evident in the current COVID-19 pandemic. The hybrid CNN was compared against traditional CNNs for its ability to improve detection of pneumonia and prognostication amongst patients with COVID-19.

The second step looked at the ability of the hybrid CNN to automate MRI scan prescription, addressing a key factor that limits the availability of cardiac MRI. This shows how a neural network, initially trained to handle morphologically normal hearts, can continuously learn from human supervision, and efficiently learn a variety of congenital heart morphologies while tolerating technical changes such as magnetic field strength.

The third step evaluated the ability of hybrid CNNs to extend beyond what is considered feasible with conventional computational algorithms. Specifically, complex intracardiac hemodynamics is inferred while being provided only partial information, and correct 4D Flow MRI phase-error for accurate quantification of blood flow. This demonstrated application of the principles of the hybrid CNN architecture for monitoring of CNN operation during clinical use.

The hybridization of segmentation and classification CNNs combine the best of both worlds: the ability to learn from expert delineation and the ability to discover new discriminating characteristics that might be too difficult to manually delineate. The hybrid multitask networks achieve more than the sum of their parts. For example, as described in U.S. Pat. No. 10,909,681, localization improves when the CNN is also trained to localize features concurrently, suggesting that the CNNs develop shared "feature maps" when learning related tasks.

Plasticity is also important property of CNNs, as it points to their ability to adapt to new patient populations, site-specific technical variations, and technological change. CNNs can be taught to flexibly expand to different environments using transfer learning, which strategy can be used to improve the autopilot MRI system described by Blansit K, et al., in "Deep Learning-based Prescription of Cardiac MRI Planes", *Radiol Artif Intell.* 2019 Nov. 1; 1(6), incorporated herein by reference. In some embodiments, optimal data selection can be achieved by "uncertainty sampling", a popular strategy for active learning to minimize cost of human supervision and enable CNNs to continually adapt to their environments. Given that segmentation CNNs can perform in this manner, this approach is also achievable with hybrid networks.

The ability of CNNs to perform complex tasks beyond classification and segmentation has been demonstrated. This includes the elimination of reconstruction artifacts, acceleration of acquisition and super-resolution. The final step builds upon cardiac MRI super-resolution described in US Patent Publ. No. 2022/0114699 to perform a complex task that is intractable with computational methods—to infer blood flow fields from planar images without explicit delineation of cardiac boundaries.

Examples 1-3 below detail the different steps of the step-wise approach which demonstrates the efficacy of the inventive multi-prong hybrid CNN technique for biomedical image analysis. Examples 4 and 5 illustrate application of the inventive approach to analysis of imaging data.

Example 1: Hybrid Multitask CNNs Provide Natural Explainability

The detection, localization and assessment of severity of COVID-19-associated pneumonia on chest x-ray is an ideal model system for the strategy to hybridize classification and segmentation neural networks. The spectrum of findings of COVID-19 pneumonia ranges from subtle ground glass to florid diffuse alveolar damage. The diagnosis of pneumonia associated with COVID-19 was of critical importance during the pandemic, with millions of RT-PCR confirmed infections and hundreds of thousands of deaths. Patients who present with lung injury (pneumonia) are known to exhibit greater need for hospitalization, intubation, mechanical ventilation and ultimately are also those with greatest risk of mortality. Over the first several months of the pandemic, x-ray emerged as a cost-effective tool for assessing for the presence and severity of lung involvement, essential for triage and management of symptomatic patients with COVID-19. Several strategies for detecting pneumonia were proposed, primarily leveraging classification labels provided alongside a public database of 112,120 frontal chest radiographs from NIH, using classification networks such as VGG, ResNet, and Inception. One "augmentation" strategy described by Hurt, et al. ("Augmenting Interpretation of Chest Radiographs With Deep Learning Probability Maps", *J Thorac Imaging.* 2020 Sep. 20; 35(5):285-293, incorporated herein by reference) used a U-Net architecture, leveraging bounding boxes for 25,684 of the NIH radiographs achieving similar performance, despite training with fewer images, highlighting the benefit of training with stronger ground truth data.

The objective of this first step is to create and evaluate the ability of hybrid CNN architectures that leverage the distinct benefits of classification and segmentation CNNs. The hybrid CNNs are intended provide the natural "explainability" and "teachability" of segmentation networks, while providing enough architectural flexibility to learn additional characteristics of COVID-19 pneumonia without explicit programming or feature delineation.

X-ray and CT image data were collected from two distinct cohorts of patients to evaluate the ability of the CNNs to detect pneumonia, including COVID-19, from a background of other pathologic processes that may share similar appearances. For machine learning research, the most important factor to ensure robust, reproducible and unbiased results is selection of representative patient populations to include in algorithm training and its ultimate validation.

Historical image data acquired during routine clinical care was obtained for two cross-sectional patient populations. The first cohort was defined as all patients who underwent x-ray and CT on the same day. It was expected that some had pneumonia caused by COVID-19 or other causes, while others had other conditions that would typically be diagnosed with x-ray and CT, including pulmonary edema, pulmonary embolism, cancer, or interstitial lung disease. Without an appropriate background population, algorithm performance can be easily overestimated. For example, in prior work using a U-Net segmentation strategy for pneumonia localization, an increase in AUC was observed for diagnosis of pneumonia from 0.856 to 0.944 by simply removing potentially confounding diagnoses from the test population. The second cohort is defined as all patients who underwent x-ray or CT during work-up of COVID-19, including imaging both before and after RT-PCR, inclusive of patients with positive and negative RT-PCR results. This important cohort provided a broad cross-section of patients and their imaging prior to and since the beginning of the SARS-CoV-2 pandemic. This also provided a longitudinal view of patients as they exhibited changes in lung involvement over the course of the disease.

A U-Net-based algorithm developed for the detection of pneumonia showed the potential of CNNs to enhance the diagnostic value of x-rays by highlighting suspicious foci. As COVID-19 began to emerge, this algorithm was found to also able to detect COVID-19 pneumonia from the earliest cases of COVID-19 in China and its first reported arrival in the United States. However, it was also recognized that the initial algorithm was only trained on publicly available images, prior to COVID-19, and that the bounding boxes for pneumonia were supported only by expert radiologist opinion without supporting data. To address this, a larger more comprehensive cohort of patients was developed with stronger data supporting localization. For the former, the two cohorts mentioned above are used. For the latter, it was recognized that computed tomography (CT) provides superior spatial localization and can differentiate between diseases with similar x-ray appearances.

In preliminary work, 1479 patients who underwent x-ray and CT on the same day during routine clinical care over the first 3 months of 2020 were retrospectively accrued. Using the assumption that more precise markup of x-rays, based on knowledge of the concurrent CT, would improve the performance of the CNN, these were combined with knowledge from more coarse but more numerous annotations that were used to train the original algorithm. This approach capitalized on the large volume of image data provided through NIH and RSNA, and on the smaller volume but more precise annotations created internally. Observations based on this work included that the initial CNN_algorithm had weaker performance on the smaller, annotated image data than on the NIH/RSNA images that it was originally trained on. However, by including the smaller image data set with more precise annotations of pneumonia as within the training data, the updated CNN algorithm was able to improve performance on both data sources. This provides supporting evidence that this approach to training CNNs is not only feasible but is further enhanced with more precise ground truth knowledge, resulting in improved performance for both detection and localization.

Based on these preliminary results, two architectural strategies were evaluated for hybridizing classification and segmentation CNNs. As shown in FIG. 1, the first strategy involved "downstream classification", shown in the upper panel, where a classification module 104 is appended as a branch near the end of segmentation U-Net 102. The image segmentation branch 102 and classification branch 104 can then be concurrently optimized with a joint loss function. The second strategy, shown in the lower panel, is referred to as "midstream classification", where a classification module 106 is appended near the end of the encoding arm 108 of the segmentation U-Net 110. The encoding arm 108 may also be replaced with more complicated classification architectures, while adding skip connections to the decoding arm. The segmentation and classification branches can then be concurrently optimized with a joint loss function. Both strategies have potential to further improve performance over classic architectures.

While many classification CNN algorithms have been proposed for medical imaging, few have yet been used to assess disease severity. This is of particular importance for COVID-19, as patients who present with more severe pneumonia on x-ray tend to have worse severe clinical courses and greater likelihood of mortality. There are two primary mechanisms for CNNs to grade severity, either (a) through direct regression or (b) through computations of inferred segmentations. The preliminary work investigated the latter, indicating that a hybrid CNN can achieve greater performance. Multiple metrics were defined from the enhanced algorithm: (a) maximum probability, (b) mean probability and (c) fractional area involvement. "Maximum probability" is defined as the highest probability inferred by the CNN; "mean probability" averages the inferred probability map over the area of both lungs, and "fractional area involvement" calculates the area of lung exceeding 50% probability, and divides this by the total lung area.

Cardiothoracic radiologists were enlisted to score x-rays from patients with COVID-19 pneumonia using a previously-defined modified Radiographic Assessment of Lung Edema (mRALE) scoring system. The hybrid architectures were trained to predict the mRALE score in addition to the pneumonia localization map and compare each of the metrics above against manual radiologist mRALE scoring. Approximately 1500 x-rays were curated from RT-PCR positive patients with COVID-19, including x-rays obtained prior to diagnosis, and divided them amongst five radiologists. The same x-rays were also scored by the updated U-Net CNN described above. By implementing a hybrid architecture to directly predict severity scores, the regression arm helps the CNN learn additional characteristics that influence radiologists' severity grading, beyond the annotations of pneumonia explicitly delineated by radiologists.

CNN architectures were compared for their differential ability to predict clinical outcomes. This assessment has clinical implications for clinical use, but also confirms the value of CNN measurements. In patients with COVID-19, severity of pneumonia on presentation is highly predictive of mortality, when scored by expert readers. Early work indicates that classification CNNs may also help to prognosticate outcomes. A preliminary experiment was conducted on a convenience sample of 209 patients RT-PCR-positive for COVID-19 who received an x-ray within the first three days of presentation (a subset of the second cohort defined above). The improvement in effectiveness is due to the synergistic effect of the regression arm, which is able to learn additional characteristics that predict survival, beyond the features explicitly delineated by radiologists.

Example 2: Combining Active Learning Approaches with Hybrid Multitask CNNs

Convolutional neural networks are remarkably plastic and can be taught to expand beyond their initial training to accomplish similar tasks in new patient populations or modalities. This feature of CNNs is highly attractive, especially since historically many machine learning algorithms have been found to be brittle or poorly generalizable to patient populations beyond their initial training. The step employed a model system based on the U-Net-based MRI autopilot system described by Blansit, et al. This MRI autopilot system includes multiple neural networks, each of which performs a specific visual task that is usually performed by an expert physician or technologist as they march stepwise through dedicated imaging planes that comprise a cardiac MRI. An important facet of ensuring generalizable performance of these neural networks is that the data that they are trained on should be inclusive of images that they will ultimately see during their clinical use. However, the latter is difficult to ensure, as inevitably there will be advances in technology, including new pulse sequences or hardware as image quality and techniques evolve. Equally importantly, imaging technique and patient populations can vary considerably between practices and can readily stretch beyond the initial training data.

The objective of this step is to leverage the pixel-wise granularity of the hybrid CNN architectures to engage active learning. Hybrid CNNs are able to undergo active learning with the use of uncertainty sampling, which allows optimal selection of teaching cases. This process starts with the existing U-Net CNN system described by Blansit, et al., which is capable of automating components of MRI scan acquisition. The system was trained initially on images from a 1.5 T MRI, excluding patients with complex congenital heart disease. This model system was then taught to perform similar tasks on images obtained at 3 T and patients with congenital heart disease. Several uncertainty sampling metrics were compared to assess their effectiveness to improve performance on these localization tasks.

One reason for the popularity of classification CNNs is that curation of training data does not require specialized domain knowledge, which can be harvested from radiology text reports. As discussed above, it is possible to achieve improved performance for detecting pneumonia by incorporating higher quality training data. However, this higher quality data comes at an increased cost, requiring greater radiologist/physician domain expertise for direct image annotation. Thus, it is helpful to identify and prioritize training examples that produce the greatest improvement algorithm performance, especially if training examples can be selected without a human supervisor. This allows the autopilot MRI system to extend beyond its initial training to handle the variety of morphologic patterns of congenital heart disease and automate congenital heart MRI.

Figure 2A:
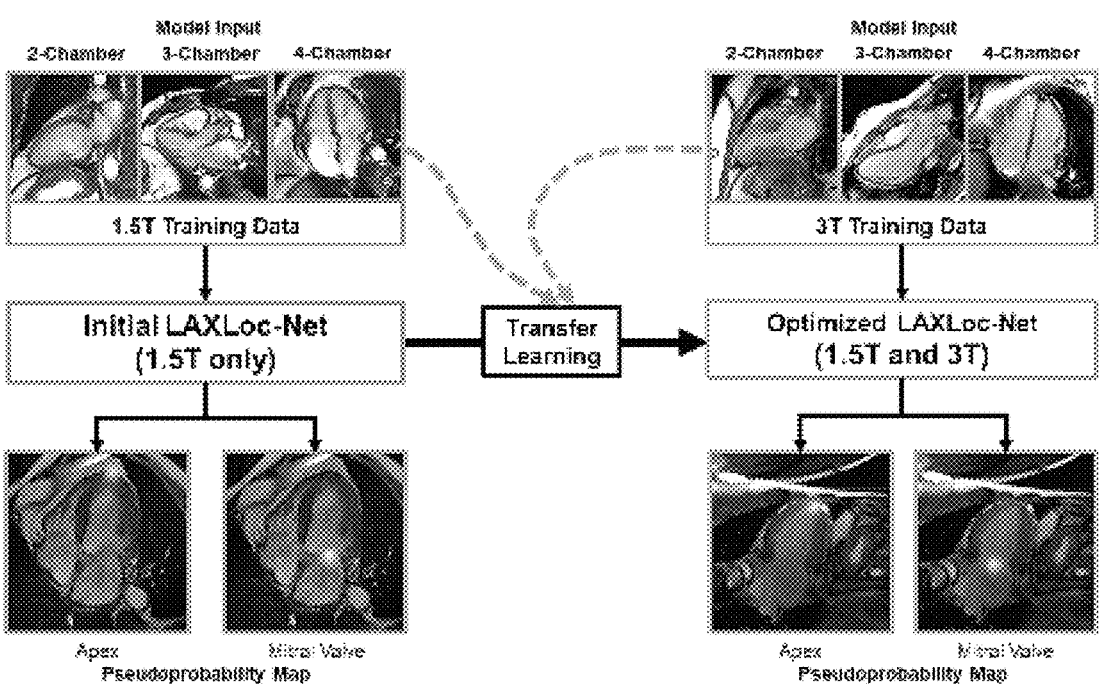
FIGS. 2A-2B are schematics illustrating a combination of uncertainty estimation and transfer learning for CNN active learning.
Figure 2B:
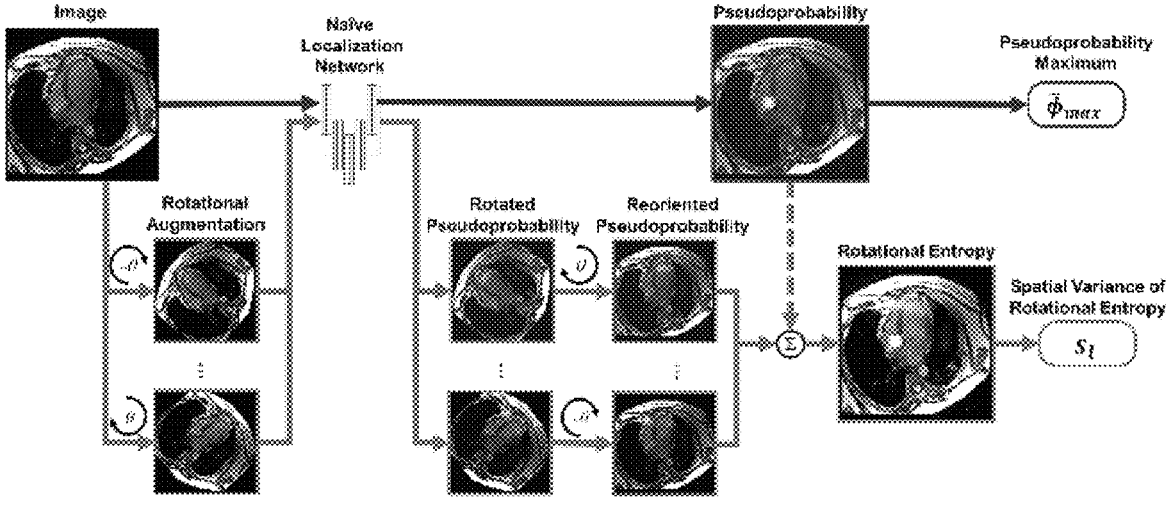

Training cases for active learning were selected using uncertainty sampling. Uncertainty sampling involves creation of metrics that estimate the confidence of the neural network while performing a task. In order to automate the visual tasks of identifying key anatomic landmarks, U-Net CNNs were trained using a heatmap regression strategy. For this model system, two metrics may be used to conduct uncertainty sampling on these heatmap regression CNNs: pseudoprobability maximum ($\hat{\phi}_{max}$) and spatial variance of rotational entropy ($S_I$). FIG. 2A shows a schematic of a strategy to tune performance of the MRI autopilot system to perform well on both 1.5 T and 3 T images. In FIG. 2B, the two metrics are defined, computed from CNN inferences. Pseudoprobability maximum is computed as the image-wide maximum of the inference image. Rotational entropy is computed with test-time augmentation with multiple image rotations merged into an entropy map and compute its spatial variance.

An uncertainty metric can be used to rank cases that are problematic for the CNN, which can then be triaged for expert annotation as a source of data for active learning. To improve the performance of the existing autopilot system, which was initially trained on 1.5 T SSFP images, 3 T SSFP images were used. The 3 T SSFP images tend to have lower blood pool to myocardial signal contrast, and greater susceptibility to off-resonance artifacts.

Preliminary results of these uncertainty metrics are shown in FIG. 3. When presented to the CNN, images with a lower pseudoprobability maximum had greater localization error. Similarly, images with higher spatial variance of rotational entropy had greater localization error. Cardiothoracic radiologists manually annotated all images in the training cohort and ranked cases according to the $\hat{\phi}_{max}$ and $S_I$. As the number of training examples increased, CNN performance improved. However, fewer training examples were required to achieve the same performance when ranked by uncertainty. Result curves shown show the mean of 5-fold cross-validation, varying the independent test set.

Preliminary data indicates that a continuous active learning strategy for segmentation CNNs, such as U-Net, is highly effective. Further validation of this approach was next undertaken for the inventive hybrid multitask CNNs.

Alternative strategies, such as query-by-committee, may also be employed for active learning. Query-by-committee involves training and interrogation of multiple algorithms and assessing the consistency of results between candidate algorithms. Along the same lines, ensemble CNNs have become popular to provide robustness to algorithm performance. Ensemble networks may be separately trained with different patient cohorts for particularly challenging cases. For example, an ensemble of long short-term memory (LSTM) and VGG-19 has been used for selection of myocardial inversion time, creating an architecture referred to as STEMI-Net, disclosed in U.S. Pat. No. 10,909,681, which is incorporated herein by reference.

Example 3: Hybrid Multitask CNNs Perform Complex Tasks with Algorithmic Transparency One essential property of CNNs that contrasts with traditional analytic approaches is the ability of CNNs to infer relationships without explicit programming. For some problems, explicit computational solutions can be either intractable or computationally expensive. CNNs provide an elegant solution for many of these problems, including for MR and CT image reconstruction, elimination of MRI reconstruction artifacts, acceleration of acquisition, and enhancement of cardiac MR image detail with spatiotemporal super-resolution. For these problems, CNNs make inferences that may not be readily confirmed by a human observer. However, without algorithmic transparency, it may be difficult to discriminate between two scenarios: (a) proper functioning of the CNN with an unexpected result or (b) malfunction due to use of the CNN outside of the bounds of the intended use or scope of algorithm training.

In this final step, hybrid architectures use CNNs to solve complex problems while also addressing the issue of algorithm explainability. The model problem is to train a CNN to infer of cardiovascular blood flow fields, which are underconstrained for fluid dynamical calculations. A second model problem is to correct background phase-error, a current Achilles heel of phase-contrast MRI. The approach involves using the parallel arms of a multitask CNNs to serve as engineered "windows" to identify when there is failure of CNN inference, when it is operating outside its domain of expertise.

Figure 4:
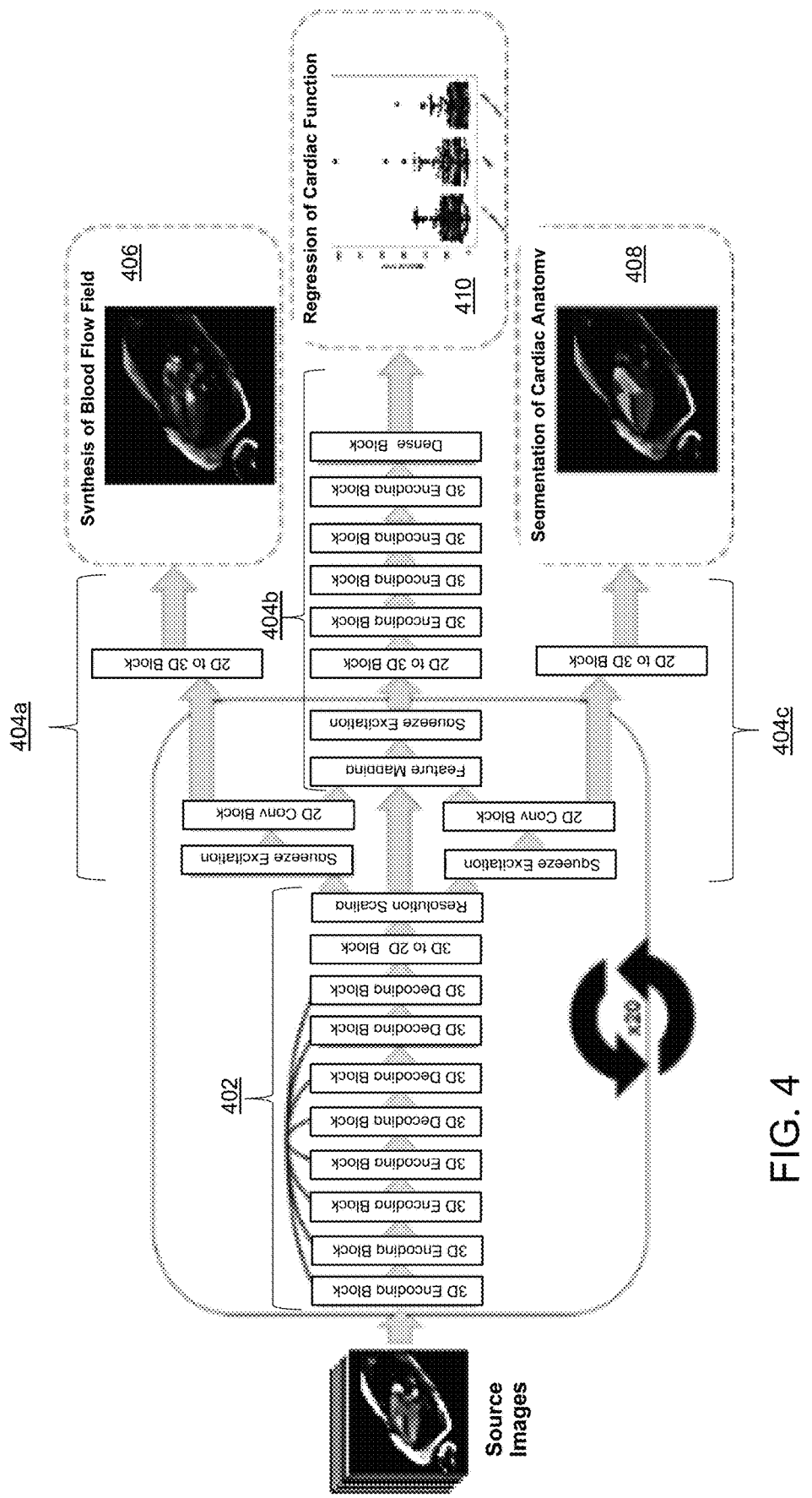
FIG. 4 is a diagram of the architecture of an embodiment of the inventive multi-task hybrid CNN referred to as "Triton-Net".

FIG. 4 provides a diagram of the proposed architecture of the hybrid CNN architecture according to an exemplary implementation of the present approach to medical image analysis. The main body of the trident-shaped architecture is formed by a U-Net 402, while additional arms 404*a-c* conduct the inference of the flow field 406, segmentation of cardiac chambers 408, and regression of cardiac function parameters 410 such as stroke volume and ejection fraction.

Preliminary results of an inferred flow field from the Triton-Net-Flow architecture, trained on 200 4D Flow cardiac MRIs, validated on 50 MRIs is shown in FIG. 5. In the upper panel, synthesized blood flow fields are visually and quantitatively similar to those measured by 4D Flow MRI. In the lower panel, RMSE plots for all the 50 cases in the test set show that Triton-Net outperforms a standard monoplane Simpson method for calculation of stroke volume and ejection fraction. With relatively few training examples, using the inventive hybrid CNN architecture, Triton-Net-Flow was able to infer a typical pattern of mid-systolic flow in the left ventricular outflow tract through the aortic valve. Such performance on so few images suggests that inference of blood flow for more complex and uncommon geometries such as congenital is possible.

An analogous problem where Triton-Net's inventive approach may have immediate clinical application is the correction of background phase-error in 4D Flow MRI, which is a yet-unsolved long-standing problem across MRIs from multiple manufacturers. This underrecognized but essential step is required for accurate measurement of blood flow. As described in U.S. Pat. No. 9,513,357, incorporated herein by reference, an algorithm for phase-error correction (also known as "eddy-current correction") capitalizes on manual delineation of static soft-tissue. This algorithm and subsequent work based on it, showed that a 3D polynomial fit was sufficient to correct the background phase error in static soft tissues. While some fully automated methods had previously been proposed, they were not uniformly reliable across body territories. Part of this is due to considerable variation in amounts of static soft tissue in each territory, and confounding effects of soft tissue spatial aliasing or devices such as sternal wires, which can cause local distortions in phase. Nonetheless, CNNs have exhibited the ability to recognize a wide range of anatomic structures. 4D Flow MRI is frequently performed for follow-up on patients with neurovascular arteriovenous malformations (AVM) prior to and following stereotactic radiosurgery and pelvic venous congestion, in addition to routine clinical use for congenital heart disease. This provides a wide range of clinical indications and body territories for training a generalized CNN to model and correct background phase error. Triton-Net can also simultaneously inference the corrected flow field, while regressing the coefficients of a background phase error polynomial model.

Revisiting the issue of CNN explainability for algorithms that generate image results, inference of intracardiac flow fields and phase-error correction are examples of situations where the output of the CNN is not easily visually verifiable by a human observer. The parallel branches of the multi-prong hybrid structure may serve not only as a mechanism to accomplish parallel tasks, but, due to the shared features along the common trunk, the branches will tend to succeed and fail together and can serve as "windows" to assess the reliability of the CNN inference. This behavior can be evaluated via a test of the Triton-Net-Flow CNN's inference blood flow fields and segment cardiac structures on short-axis images of the heart, when trained only on long-axis images or vice versa. While one would expect that each of these tests will cause failures to varying degrees, the failures in segmentation will mirror failures in blood flow field inference. Similarly, for Triton-Net-ECC, the ability of the CNN to handle phase-error correction can be evaluated using a body territory on which it has not yet been trained. The ability of the CNN to segment anatomic structures such as the heart, lungs, brain, liver or kidneys can be used as a readout of its recognition of which body territory it is attempting to correct phase error on. The Triton-Net hybrid CNN architecture is able to infer complex intracardiac hemodynamics and solve background phase error correction for 4D Flow MRI across multiple body territories. The branches of the hybrid architecture provide windows into the function of the CNN, providing warnings when it is attempting to infer knowledge beyond its capability.

Artificial intelligence is a young and evolving field, advancing rapidly while rediscovering its potential and standards for application in diagnostic imaging. Classification, regression, and segmentation CNNs have diverged in their evolution, as they have become optimized for specific image recognition or segmentation tasks. The inventive approach shows that these seemingly disparate tasks can not only be accomplished concurrently with a single neural network, but that this strategy can improve overall diagnostic performance, while addressing concerns of explainability and adaptability that currently plague conventional architectures.

Classification and regression neural networks have continued to evolve in the last several years, including extraordinarily deep architectures such as ResNet, Inception, and Xception with increasing performance on large data sets of non-medical images. They perform favorably on the tasks for which they were designed. It remains uncertain whether certain problems, such as detection of pneumonia on x-ray, are better served by classification or image segmentation networks. There has yet been little exploration on hybrid networks that perform both tasks concurrently. New CNN architectures such that the hybrid CNN scheme disclosed herein accomplish multiple tasks to overcome a critical hurdle in the field, allowing synergistically improved performance for image classification while enabling inherent transparency and explainability.

The inventive approach contributes to the enablement of these algorithms to complement human physicians and iteratively improve in new environments. Such innovations and principles will become necessary for robust and consequential application of CNNs across multiple fields of medical imaging.

Example 4: Inference of Cardiovascular Fluid-Mechanical Relationships from Routine Cardiac MR Images The inventive 3-prong CNN, (Triton-Net) was used to synthesize the blood flow (in the cardiac chamber) or myocardial (in the cardiac muscle) velocity field, while concurrently segmenting ventricular chambers and localizing cardiac landmarks. To evaluate technical performance of Triton-Net, segmentation and localization were assessed with Sorenson-Dice coefficient and Euclidean distance, relative to manual annotation. Synthesized flow fields were compared against 4D Flow fields by computing pixelwise root-mean-squared-error. As a clinical proof-of-concept, the algorithm was evaluated for its ability to detect left ventricular hypertrophy and predict outflow gradient >25 mmHg, measuring area under the receiver operating characteristic curve (AUROC).

Referring to FIG. 6, we retrospectively collected a convenience sample of 139 cardiac MRI exams that included 3-chamber Cine SSFP and 4D Flow as part of the clinical exam between December 2017 to May 2021 (step 602). On a per patient basis, in step 604, exams were divided 64% for training (89/139 examinations) (step 606) and 36% for independent testing (50/139 examinations) (step 608). The testing set was specifically enriched to contain patients with elevated outflow gradient i.e., peak pressure gradient exceeding 25 mmHg at the AV or LVOT, and randomly allocated the remainder of patients. Of the 50 patients in the test set, 7 had aortic stenosis, 8 had hypertrophic cardiomyopathy, and 1 had subaortic stenosis due to subaortic membrane. The remaining 34 patients in the test set did not have stenosis of the LVOT or aortic valve.

All 4D Flow MRI examinations were performed following administration of intravenous gadolinium contrast (gadobenate dimeglumine, 0.15 mmol/kg) and employed respiratory self-navigation, iterative compressed-sensing, and parallel imaging reconstruction. From the same set of exams, we collected 231 concurrently performed 3-chamber cine SSFP series. All studies were performed with a 3.0-T MRI scanner (Discovery MR750 DV26; GE Healthcare) with a standard 32-channel phased-array coil. The MRI scanner parameters are provided in Table 1 below. Data are means, with ranges in parentheses. "VENC"=velocity encoding.

TABLE 1

| Characteristic | Training Set | Testing Set |
|---|---|---|
| A: 4D Flow MRI Parameters | | |
| Temporal Resolution (ms) | 60 (36-75) | 59 (36-87) |
| Acquired Spatial Resolution (mm) | 2.26 × 1.94 (1.78-2.62 × 1.77-2.38) | 2.27 × 1.95 (1.89-2.75 × 1.77-2.29) |
| Acquired Slice Thickness (mm) | 3.3 (2.8-5.5) | 3.3 (2.8-5.3) |
| VENC (cm/s) | 297 (150-450) | 303 (150-450) |
| Scan time (mm:ss) | 11:29 | 11:29 |
| B. Cine SSFP MRI Parameters | | |
| Temporal Resolution (ms) | 33 (20-52) | 35 (20-56) |
| Acquired Spatial Resolution (mm) | 1.80 × 1.81 (1.56-2.08 × 1.56-2.14) | 1.83 × 1.85 (1.56-2.50 × 1.56-2.50) |
| Slice Thickness (mm) | 7.6 (5.0-8.0) | 7.5 (6.0-8.0) |

Image annotation and registration of 4D Flow and Cine SSFP images were performed using in-house software developed in Python. All 3-chamber cine SSFP series were manually annotated under the supervision of a cardiovascular radiologist with 12 years of experience in cardiac MRI. For cardiac chamber segmentation and landmark localization, we generated 1) segmentations of the left atrium, left ventricular blood pool, left ventricular myocardium, right ventricular blood pool, aortic root and 2) marked locations for the mitral valve, aortic valve, and apex.

A semi-automated strategy was used for generating the training data. The workflow included four steps: a) re-slicing source 4D Flow data to in-plane flow vectors based on each 3-chamber view's coordinates using trilinear interpolation; b) view-standardizing each paired 3-chamber-flow dataset orienting the apex upward while reducing and centering the field of view to the heart; c) manually co-registering and annotating the cardiac chambers/landmarks between 3-chamber and flow datasets using in-house software to provide CNN segmentation ground truth; and d) organizing and scaling each dataset. We scaled 3-chamber pixel values to lie within [0,1] and flow values to lie within [−1,1] to serve as CNN blood flow synthesis ground truth. In step 610, the CNN was trained and evaluated in step 612.

Figure 7A:
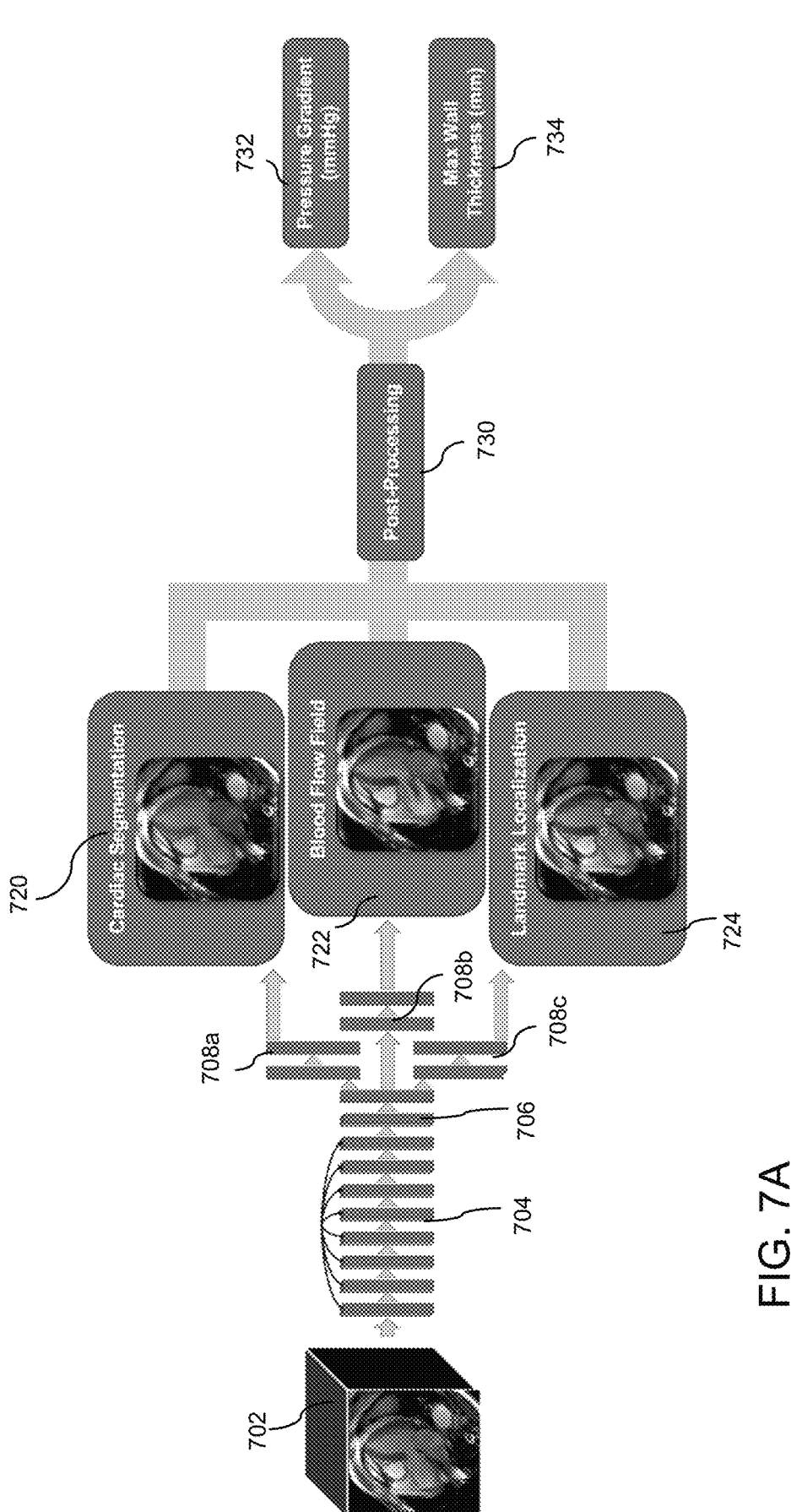
FIG. 7A is a diagram of an embodiment of the hybrid multi-prong architecture according to an embodiment with post-processing for determining pressure gradient and maximum wall thickness.
Figure 7B:
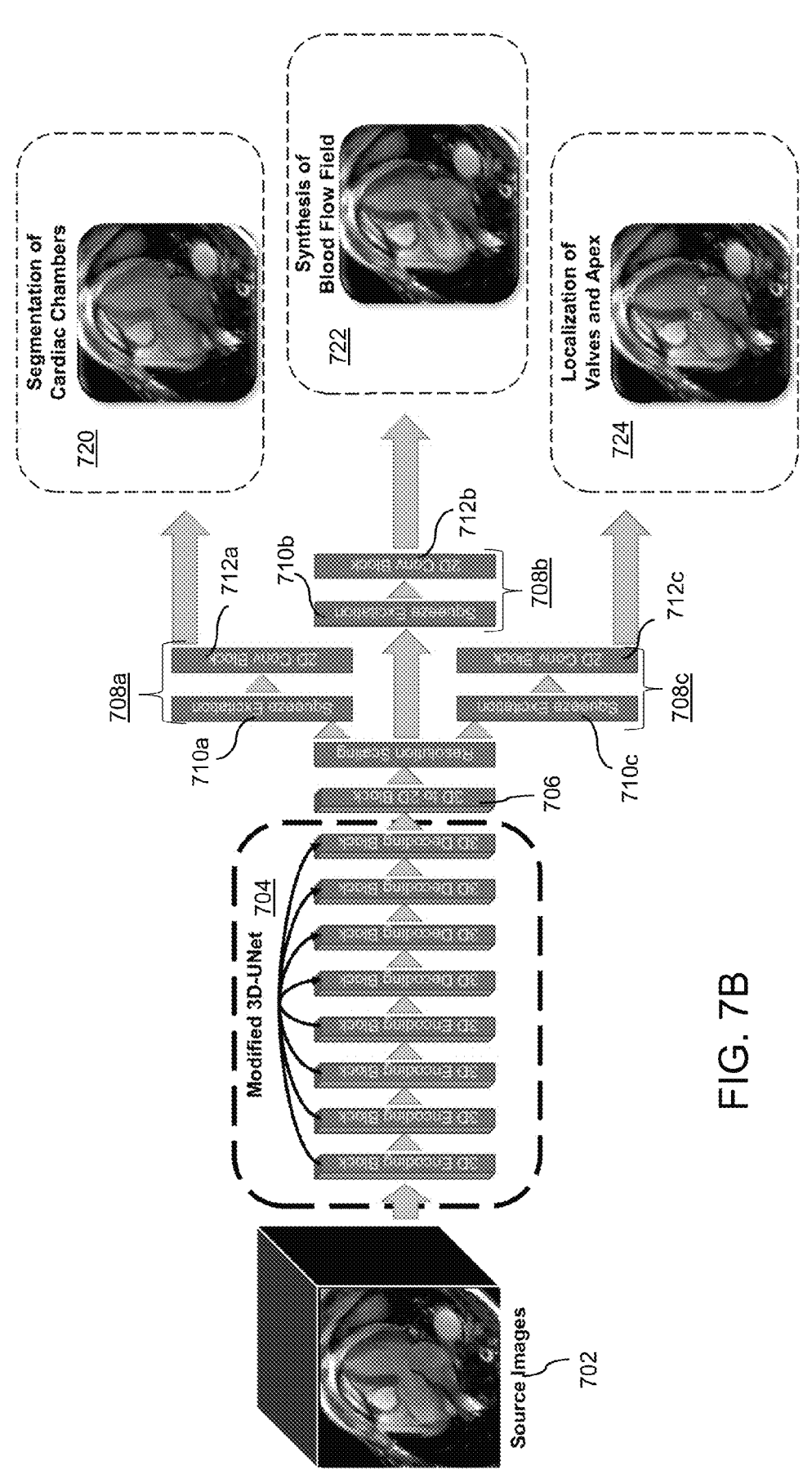
FIG. 7B illustrates the CNN structure of FIG. 7A in greater detail.

FIG. 7A illustrates a diagram of the Triton-Net multi-prong CNN architecture (with three-prongs) used in this evaluation, which broadly comprises three components: 1) A modified 3D-UNet architecture generates spatiotemporal feature maps from anatomic cine SSFP images; 2) The feature maps are condensed to a single timepoint and are scaled by the input cine SSFP series' spatiotemporal resolution; 3) The scaled feature maps are distributed to three shallow, sub-convolutional neural network output prongs based on the SRNet architecture to simultaneously generate inferences for multi-chamber segmentation, synthesis of blood flow field, and multi-landmark localization. Triton-Net takes as input five adjacent timeframes from 3-chamber cine SSFP series 702, which are passed into an encoder-decoder block 704 based on the 3D-UNet architecture, which are then temporally condensed into a single-time-frame feature map 706, labeled in more detail in FIG. 7B.

Specifically, the encoder-decoder block 704 is sequentially arranged as a 3D U-Net, a 3D-to-2D convolutional block, and a resolution scaling layer. The 3D-to-2D convolutional block includes a 3-dimensional convolutional block with kernel size 5×1×1 and appropriate padding, resulting in coalescence of the temporal dimension, followed by a lambda squeeze layer. The resolution scaling layer scales the outputs of the 3D-to-2D convolutional block, incorporating pixel resolution and heart rate. From these scaled feature maps output prongs 708$a$-$c$ produce single frame cardiac chamber segmentations 720, landmark localization heat-maps, 722 and intracardiac blood flow fields 724. Each output prong includes a sequential squeeze-excitation block 710$a$-$c$ and a SRNet block 712$a$-$c$. Triton-Net was iterated over adjacent temporal windows to generate inferences over the entire cardiac cycle. To generate point-localizations, we solve for the argmax of each heatmap.

The synthesized blood flow fields comprise pixel-wise inferences of velocity in the x and y directions. Training data were standardized by performing in-plane rotation. Training data was augmented with −5° and 5° degree in-plane rotations.

The Triton-Net was trained for 200 epochs using the Adam optimizer with a learning rate of 3e-5. Training used a Microsoft Azure virtual machine running Ubuntu 18.04 (Canonical, London, England) equipped with four Quadro GV100 graphics cards with 16 GB of VRAM (Nvidia, Santa Clara, California). TensorFlow-GPU 2.1.0 (Google, Mountain View, California) was used with mixed-precision for all deep-learning experiments.

The following describes the loss functions used for optimization. In the equations, each prong's output inference is denoted as $\hat{y}$ with its corresponding ground truth as y.

Segmentation Loss: For cardiac chamber segmentation, we employed a multichannel Dice loss function with a smoothing factor of 1:

$$\text{Segmentation Loss} = 1 - \frac{1}{N_{segmentations}} \sum_{i}^{N_{segmentations}} \text{Dice}\,(y_i, \hat{y}_i)$$

Localization Loss: A heatmap localization strategy was used for landmark localization. We Gaussian blurred the annotations for the mitral valve (s=20 pixels), aortic valve (s=20 pixels) and the apex (s=40 pixels) to serve as multi-channel ground-truth. This strategy permits use of weighted mean-squared-error (MSE) loss. We additionally solved for regions of high speed, $y_{speed}$ (values greater than 0.05 in ijk coordinates). Together, the combine loss function took the form of:

Localization Loss =

$$\left( \frac{1}{N_{localization}} \sum_{i}^{N_{localization}} MSE(y_i, \hat{y}_i) \right) + \lambda * MSE\left(y_{speed}, \hat{y}_{speed}\right)$$

$$\lambda = 1000$$

Flow Synthesis Loss: For blood flow field synthesis, we built a custom loss function incorporating the multi-scale structural similarity index (MSSSIM) and piecewise linear regression for each component of velocity and the speed. We first define our piecewise linear regression function:

Given 1D vectors of inferred, $\hat{x}$, and ground truth, x, values, solution of the normal equation yields coefficients defining the best-fit linear regression: For example: We first generate a matrix $$A = \begin{bmatrix} 1 & x_1 \\ \vdots & \vdots \\ 1 & x_N \end{bmatrix}$$

and a column vector $$\hat{x} = \begin{bmatrix} \hat{x}_1 \\ \vdots \\ \hat{x}_N \end{bmatrix}.$$

Solving $(A^T A)^{-1} A^T \hat{x}$ yields the coefficient matrix, $$\hat{\theta} = \begin{bmatrix} \hat{m}_0 \\ \hat{m}_1 \end{bmatrix},$$

such that $\hat{m}_1 x + \hat{m}_0$ defines the least-squares best-fit line. Given objective coefficients, $$\theta = \begin{bmatrix} m_0 \\ m_1 \end{bmatrix},$$

the loss function takes the form of $\Sigma(\theta' - \hat{\theta})^2$. Under ideal conditions, values of $\hat{m}_0 = 0$ and $\hat{m}_1 = 1$ mean $\hat{x} = x$. However, experimentally, objective values of $m_0 = 0$, $m_1 = 1$ do not necessary yield $\hat{m}_0 = 0$ and $\hat{m}_1 = 1$ and are dependent on training set composition and competing contributions from other component loss functions.

In the case of severe class imbalance e.g., preponderance of low-velocity pixels of low clinical significance, piecewise-linear regression permits greater weighing of high-magnitude pixels. For piecewise-linear regression, we wish to regress such that:

$$\hat{x} = \begin{cases} m_1 x, & |x| \geq \alpha \\ m_2 x, & |x| < \alpha \end{cases};$$

since this form is non-differentiable, we approximate it using a logistic function such that:

$$\hat{x} = m_1 x + \frac{(m_2 - m_1)(x - \alpha)}{1 + e^{-\sigma(x - a)}} + \frac{(m_2 - m_1)(x + \alpha)\left(2 + e^{-\sigma(x + a)}\right)}{1 + e^{-\sigma(x + a)}},$$

which we denote as $$\hat{x} = m_1 x + (m_2 - m_1) * f_1(x) + (m_2 - m_1) * f_2(x)$$

To solve the normal equation, we expand A column-wise:

$$A = \begin{bmatrix} 1 & x_1 & f_1(x_1) & f_2(x_1) \\ \vdots & \vdots & \vdots & \vdots \\ 1 & x_N & f_1(x_N) & f_2(x_N) \end{bmatrix}$$

Solving $(A^T A)^{-1} A^T \hat{x}$ yields the coefficient matrix, $$\hat{\theta} = \begin{bmatrix} \hat{m}_0 \\ \hat{m}_1 \\ \hat{m}_2 \\ \hat{m}_3 \end{bmatrix},$$

such that $\hat{m}_3 f_2(x) + \hat{m}_2 f_1(x) + \hat{m}_1 x + \hat{m}_0$ defines the piecewise least-squares best-fit line. As before, we can thus set our loss function to be of the form $\Sigma(\theta - \hat{\theta})^2$, where $$\theta = \begin{bmatrix} m_0 \\ m_1 \\ m_2 \\ m_3 \end{bmatrix}$$

contains our objective coefficients. Note that each component of velocity requires its own linear regression. For experiments, the following were used hyperparameters:
For objective coefficients, $m_0 = 0$, $m_1 = m_2 = m_3 = 1.25$
For logistic function, $\sigma = 10$, $\alpha = 0.3$
Thus, the flow loss function took the general form of:

$$\text{Flow Loss} = \sum_i^c (1 - MSSSIM(y_i, \hat{y}_i)) + \sum (\theta_i - \hat{\theta}_i)^2$$

Where c comprises the row and column components of velocity and the speed. We average the squared differences for the velocity components, and do not consider the negative term of the piecewise function for speed.

Peak Left Ventricular Speed Loss: An auxiliary loss function was defined to optimize peak left ventricular speed in each frame (rather than over all pixels) to aid regression of LVOT peak pressure gradients. In a given batch, each frame's inferred speed was multiplied by the commensurate left ventricular ground truth masks and applied global 2D maxpooling to solve for the peak left ventricular speeds. Using weighted linear regression, given vectors of inferred, $\hat{x}$, and ground truth, x, values (with length equal to batch-size):

$$A = \begin{bmatrix} 1 & w_1 x_1 \\ \vdots & \vdots \\ 1 & w_N x_N \end{bmatrix},$$

where $w_i$ is the ground truth peak left ventricular speed at given frame, giving greater weight to high-speed values. We declare our objective coefficients $$\theta = \begin{bmatrix} m_0 \\ m_1 \end{bmatrix},$$

with $m_0 = 0$, $m_1 = 2$
The resulting loss function is:

$$\text{Peak Speed Loss} = \Sigma(\theta - \hat{\theta})^2 + MSE(y_i, \hat{y}_i)$$

Loss Function Weighing: For training, we scaled each component loss function such that their values were of similar scale. We weighed segmentation loss, localization loss, flow synthesis loss, and peak speed loss by factors of 10, 10, 0.1, and 0.1, respectively. The final loss function is, therefore:

Loss=10(Segmentation Loss+Localization Loss)+0.1
(Flow Loss+Peak Speed Loss)

Performance Evaluation: Referring briefly to FIG. 7A, to evaluate the clinical utility of the Triton-Net hybrid CNN architecture for outflow obstruction, CNN inferences were post-processed in post-processing block 730 to compute estimates for outflow gradients 732 and maximum wall thicknesses 734. Peak pressure gradients were calculated using the modified Bernoulli equation, $\Delta P=4v2$, where v is the peak speed. Gradients exceeding 25 mmHg were considered significant. Left ventricular wall thickness was calculated by defining the mitral valve-apex axis and slicing the end-diastolic myocardial mask orthogonally to this axis. Ground truth values were derived in the same manner using manual annotations and 4D Flow MRI data.

All statistical analyses were performed on the independent test set. The ability of the Triton-Net approach was evaluated to perform multi-class segmentation by calculating the Sorenson-Dice coefficient between inferred and annotated ground truth masks. For evaluation of multi-landmark localization performance, we calculated the Euclidean distance between the inferred and annotated ground truth landmark coordinates. The first, second, and third quartiles for Dice coefficients and Euclidean distances are reported.

To evaluate correlation between synthesized and ground truth blood flow fields, pixel-wise calculation of Pearson correlation was performed. Additionally, we reported the per-frame root-mean-squared-error between synthesized and ground truth flow fields for each chamber. To assess effectiveness of the CNN-derived classifications of outflow stenosis and myocardial hypertrophy, ROC (Receiver-Operating Characteristic) curves were generated by comparing inferred and ground-truth values and reporting the area under the receiver operating characteristic curve (AUROC).

Statistical analysis was performed using Python (version 3.7, Python Software Foundation, Wilmington, Del.), NumPy, SciPy, scikit-learn, and Excel (Microsoft, Redmond, Wash). Statistical significance of correlation between inferred and ground truth values was assessed using the Wald test with type I error threshold of 0.05.

Results

For CNN development and evaluation, we retrospectively collected 139 4D Flow MRI series and 243 corresponding 3-chamber cine SSFP series from 139 patients (mean age, 51 years±18; 66 female). MRI exams from 50 patients were reserved for independent testing of the CNN algorithm. 64% had myocardial wall thickness greater than 15 mm and 32% had left ventricular outflow peak gradient exceeding 25 mmHg.

Figure 8A:
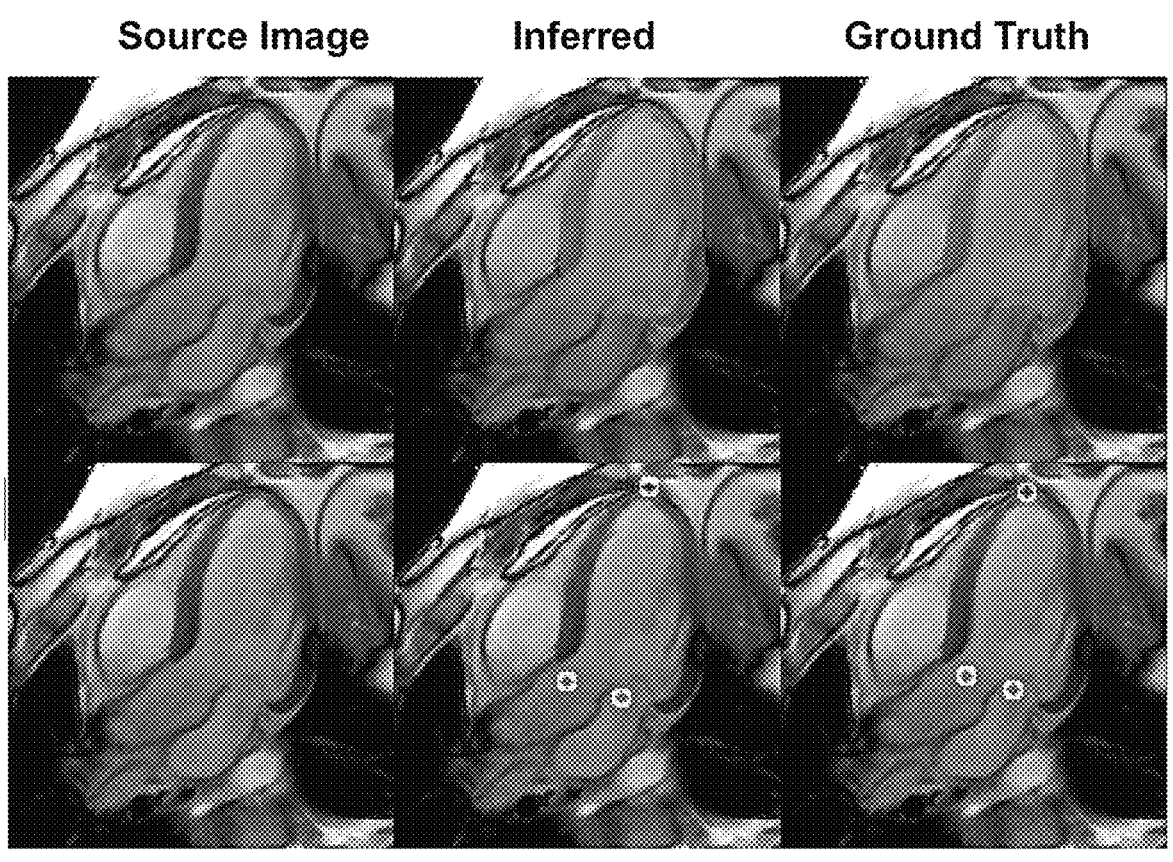
FIGS. 8A-8C illustrate a representative case of chamber segmentation and landmark localization, where FIG. 8A compares source image, inferred image and ground truth.
Figure 8B:
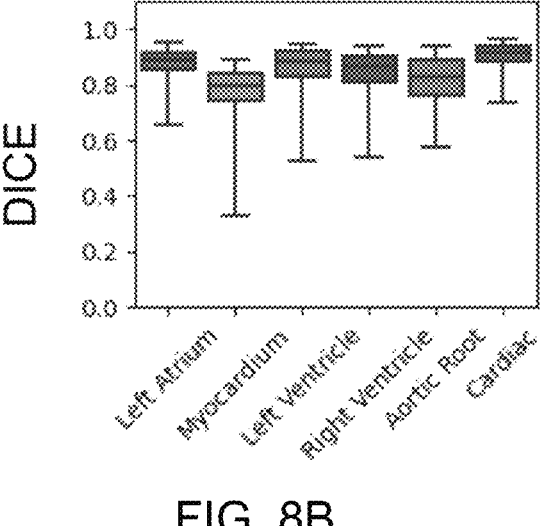

For chamber segmentation and landmark localization, we observed strong overlap between inferred and ground truth segmentations as assessed by the Dice coefficient (FIG. 8B). Median Dice coefficients (with 1st and 3rd quartiles in parentheses) are listed in part A of Table 2, which lists the results of Triton-Net Cardiac Segmentation and Landmark Localization. Data are medians, with first and third quartiles in parentheses.

TABLE 2

| A: Triton Net Segmentation Performance | DICE |
| --- | --- |
| Left Atrium | 0.89 (0.85-0.92) |
| Left Myocardium | 0.80 (0.74-0.84) |
| Left Ventricle | 0.89 (0.83-0.92) |
| Right Ventricle | 0.87 (0.81-0.90) |

TABLE 2-continued

| Aortic Root Cardiac Mask | 0.83 (0.76-0.89) |
| --- | --- |
| B: Triton-Net Localization Performance | Distance (mm) |
| Mitral Valve | 4.20 (2.80-5.80) |
| Aortic Valve | 3.14 (1.99-4.84) |
| Apex | 4.45 (2.81-6.30) |

Figure 8C:
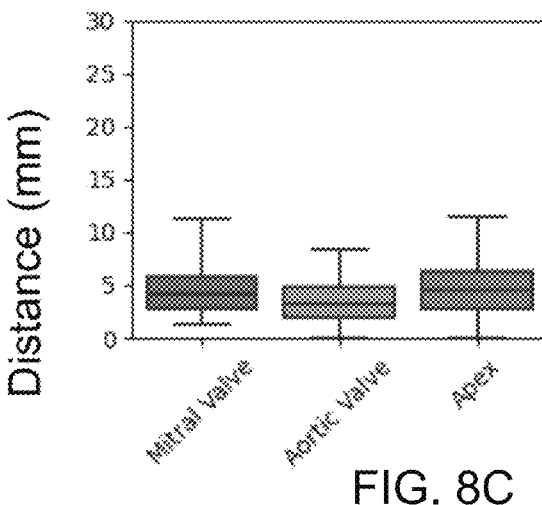

Similarly strong aggregate performance for landmark localization was assessed by Euclidean distance between inferred and annotated positions (FIG. 8C). Median distances in millimeters (with 1st and 3rd quartiles in parentheses) are listed in part B of Table 2.

FIG. 8A illustrates a representative case of chamber segmentation (upper panel) and landmark localization (lower panel) in a morphologically normal 41-year-old female. For this case, the left atrium, left ventricular blood pool, left myocardium, right ventricle, and aortic root showed good agreement between the inferred and ground truth segmentations. Likewise, we found concurrence between Triton-Net and annotated localizations of the mitral valve, aortic valve, and apex. Further agreement between inferred and annotated segmentations over the cardiac cycle was tracked for the predicted and ground truth areas for each chamber via video.

The Triton-Net architecture also exhibited the ability to synthesize intracardiac blood flow fields from two-dimensional time series, provided only image data from the 3-chamber view. Quantitatively, on a pixel-wise basis Triton-Net's approach showed significant correlation between synthesized and ground-truth velocities (FIG. 9B), with slightly stronger correlation of synthesized flow fields along the major axis than minor axis of the left ventricle. Table 3 lists the performance of Triton-Net Flow Synthesis. RMSE results are medians, with first and third quartiles in parentheses.

TABLE 3

| | Major Axis | Minor Axis |
| --- | --- | --- |
| A: Triton-Net Flow Synthesis Linear Regression | | |
| Slope | 0.75 | 0.78 |
| Intercept (mm/s) | −30.27 | −3.79 |
| Pearson Correlation Coefficient | 0.57 | 0.57 |
| P-value (Wald Test) | P < 0.001 | P < 0.001 |
| B: Triton-Net Flow Synthesis RMSE (mm/s) | | |
| Left Atrium | 154 (137-179) | 136 (124-163) |
| Left Ventricle | 220 (188-247) | 179 (154-216) |
| Right Ventricle | 142 (121-166) | 154 (140-190) |
| Aortic Root | 223 (190-273) | 252 (197-326) |

Figure 9A:
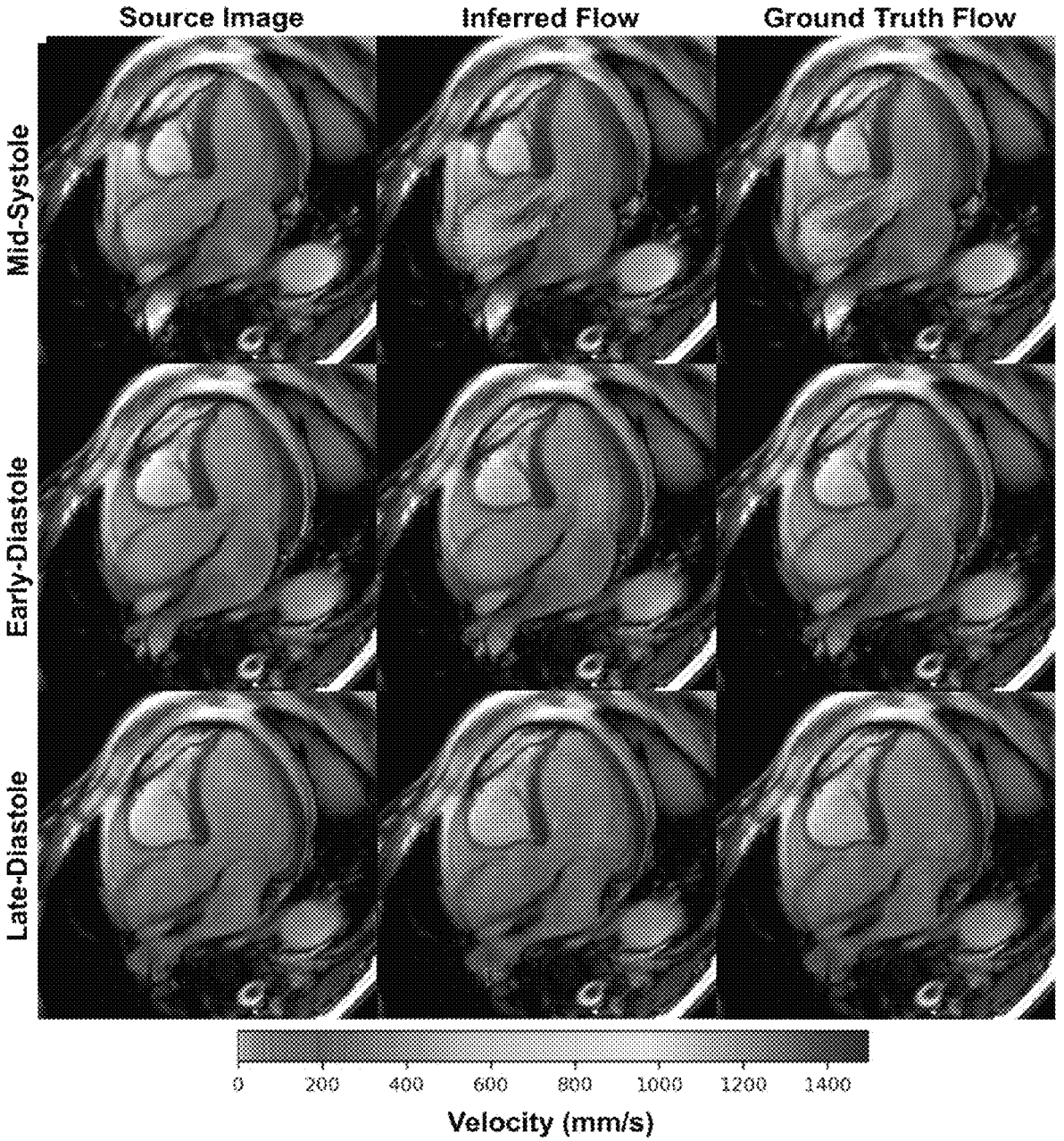
FIG. 9A shows images from a representative patient spanning several timepoints over the cardiac cycle.
Figure 9B:
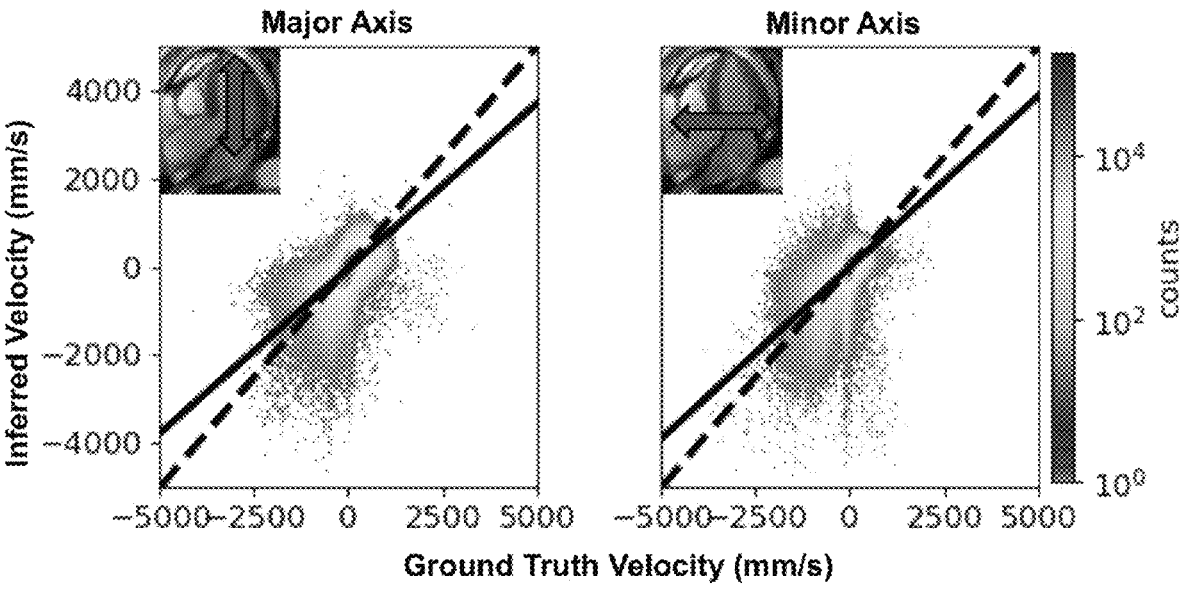
FIG. 9B plots correlation of synthesized flow fields along the major axis than minor axis of the left ventricle.
Figure 9C:
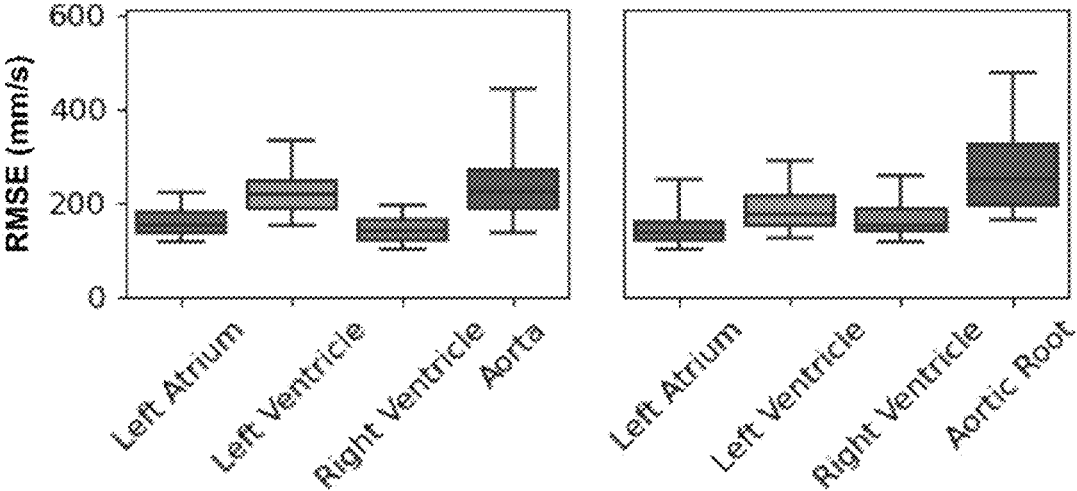
FIG. 9C plots root-mean-squared error (RMSE) for the synthesized velocities.

Root-mean-squared error (RMSE) for the synthesized velocities were within the range of measurement error of phase-contrast MRI (approximately 150-250 mm/s) for each chamber (FIG. 9C).

Images from a representative patient, a morphologically normal 69-year-old male, are shown in FIG. 9A, spanning several timepoints over the cardiac cycle. During systole, we observe the ability of the Triton-Net architecture to infer a pattern of systolic flow in the left ventricular outflow tract similar to measured velocities from 4D Flow. During diastole, the Triton-Net approach inferred mitral inflow both during early ventricular relaxation (E-wave) and atrial contraction (A-wave), which were also comparable to ground truth 4D Flow MRI data.

Figure 10:
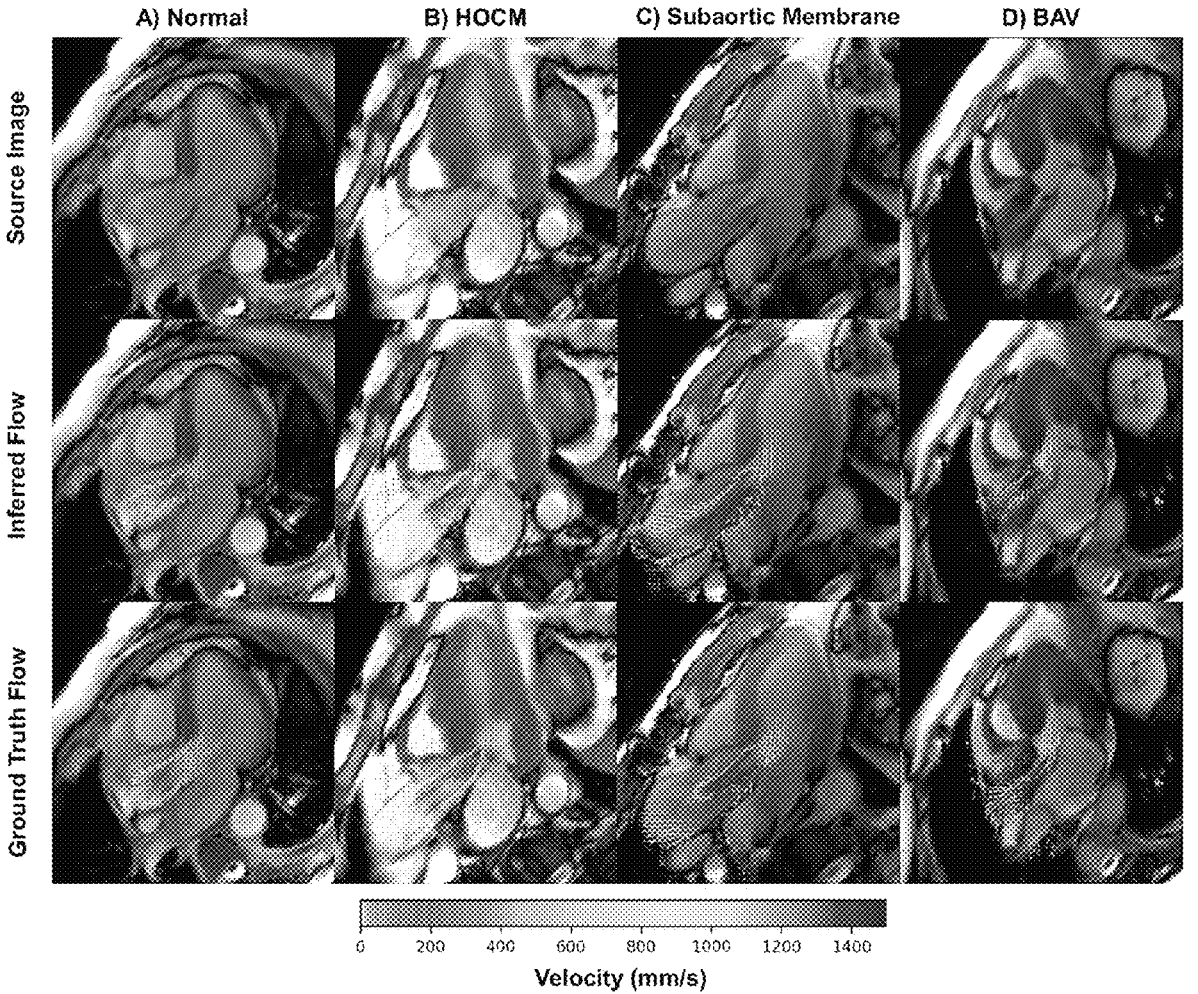
FIG. 10 illustrates comparison of the presence of high velocity flow in the left ventricular outflow tract and aortic valve as evaluated by the exemplary multi-prong CNN approach relative to the source image and ground truth for normal (A), HOCM (B), subaortic membrane (C) and BAV (D).

The Triton-Net approach was generally able to correctly infer the presence of high velocity flow in the left ventricular outflow tract and aortic valve (FIG. 10). In a morphologically normal patient, a 51-year-old female (panel A), Triton-Net inferred normal velocities within the left ventricular outflow tract, which were also normal by 4D Flow MRI. In contrast, in three representative patients with LVOT or AV obstruction on 4D Flow MRI, Triton-Net was able to infer high velocities at each location of outflow tract and valvular stenosis. In a 66-year-old male patient with hypertrophic obstructive cardiomyopathy (HOCM) and diffuse left ventricular hypertrophy (panel B), Triton-Net inferred marked flow acceleration in the narrowed LVOT, comparable to 4D Flow MRI. Inferred peak velocity was 2.689 m/s, corresponding to a gradient of 29 mmHg. Measured peak velocity on 4D Flow was 4.093 m/s, corresponding to a gradient of 67 mmHg. In a 35-year-old male patient with subaortic membrane, Triton-Net inferred the presence of high velocity flow in the LVOT (FIG. 10, panel C). Inferred peak velocity was 4.433 m/s, corresponding to a gradient of 79 mmHg. Measured peak velocity on 4D Flow was 3.317 m/s, corresponding to a gradient of 44 mmHg. Lastly, in a 69-year-old female patient with bicuspid aortic valve (BAV), Triton-Net inferred the presence of flow acceleration at the stenotic aortic valve (FIG. 10, panel D). Inferred peak velocity was 3.620 m/s, corresponding to a gradient of 52 mmHg. Measured peak velocity on 4D Flow was 3.969 m/s, corresponding to a gradient of 63 mmHg.

Figure 11A:
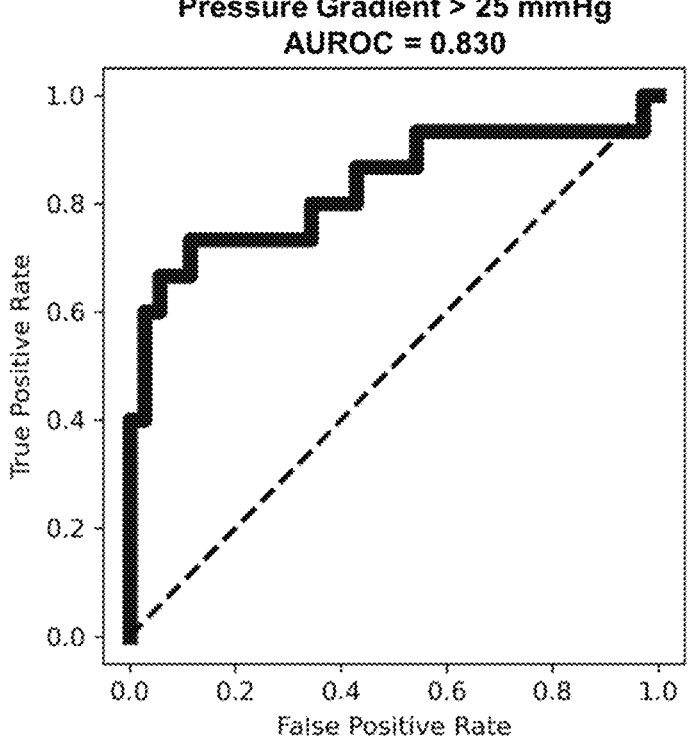
FIGS. 11A and 11B plot the results of analysis by the Triton-Net hybrid architecture for outflow stenosis and myocardial wall thickening, respectively.
Figure 11B:
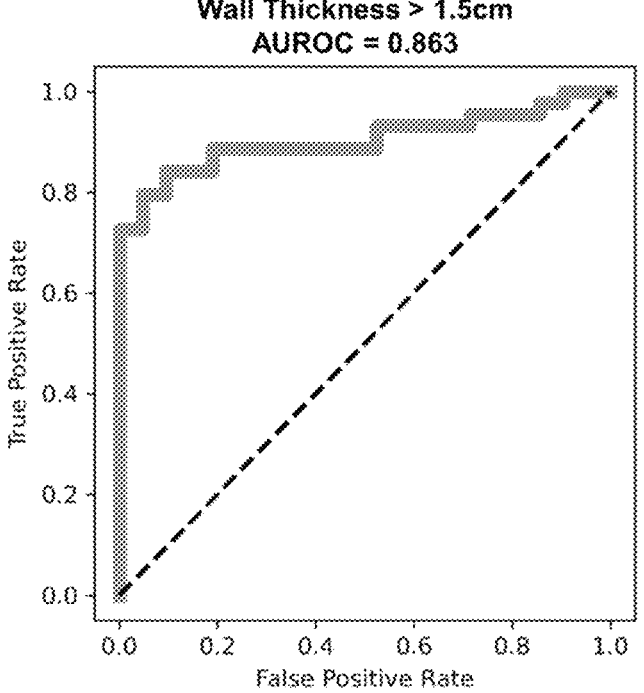

To further assess the potential clinical utility of the Triton-Net hybrid architecture for outflow stenosis and myocardial wall thickening, we performed additional analyses in the test population for detection of both entities (FIGS. 11A-11B). There was moderate agreement between outflow gradients inferred by Triton-Net and those measured by 4D Flow (p<0.001, r=0.54, slope=0.56). There was strong agreement between Triton-Net and manual measurements of myocardial thickness (p<0.001, r=0.77, slope=0.62). Receiver operating characteristic curves for detection of outflow obstruction showed strong ability to detect outflow tract obstruction exceeding 25 mmHg (AUROC 0.830). Similarly, receiver operating characteristic curves for left myocardial hypertrophy showed strong ability to detect myocardial wall thickening with end-diastolic wall thickness >15 mm (AUROC 0.863).

This example demonstrates the ability of the novel CNN architecture to concurrently perform the disparate but complementary tasks of cardiac chamber segmentation, landmark localization, and synthesis of blood flow fields. It is believed that the Triton-Net approach is the first CNN capable of synthesizing blood flow fields solely from routine cine SSFP imaging data. Furthermore, in contrast to previous methods which have attacked the segmentation and localization problems separately, the trifurcated architecture of Triton-Net is able to perform these tasks within a single comprehensive end-to-end architecture, achieving comparable performance to previously reported methods for the individual tasks.

There was strong quantitative agreement between synthesized flow fields and 4D Flow-derived ground truth across the entire cardiac cycle, particularly in the left ventricle. While synthesis of the blood flow field has historically been the domain of computational fluid dynamics, these methods are computationally expensive and require explicit boundary conditions, which are often approximated, particularly at the valves. The inventive multi-pronged CNN architecture was able to incorporate knowledge from the cardiac chamber segmentations and landmark locations to learn the relevant biomechanical relationships between the myocardial wall and blood flow velocity field from a relatively small training set. Recent work suggest that much fewer datasets are required when manual annotations of component sub-tasks are provided during training.

While this study utilized MRI data from a scanner from a single vendor, it is expected that images obtained on MR images from other vendors will further benefit the performance of the CNN on images from other sources. Further, while the study focused primarily on two-dimensional time-series, primarily on the 3-chamber view, the process may be further expanded to other imaging planes and volumetric imaging, including cardiac CTA, to enable synthesis of more comprehensive velocity fields.

Example 5: Myocardial Strain and Strain Rate

Myocardial strain and its temporal derivative, strain rate, are important measurements of cardiac dysfunction and can have a higher sensitivity for disease detection than ejection fraction. Myocardial strain is defined as the changes in length of the cardiac wall in the axial, radial, and circumferential directions after a fixed interval. Similarly, the strain rate is equivalent to the spatial gradient of myocardial tissue velocity. Thus, strain and strain-rate are local indicators of myocardial contractility and overall tissue health. Myocardial damage resulting from insults including chemotherapy, infarction, and hypertrophic cardiomyopathy frequently manifest as locally hypokinetic, akinetic, or dyskinetic wall motion. Strain and strain-rate can therefore be used to quantify these aberrant wall motions and have been shown to detect preclinical heart disease1, potentially allowing more time for medical or lifestyle interventions.

Conventionally, strain and strain rate have been computed using either image analysis or dedicated MRI pulse-sequences. Image-based estimation of myocardial strain typically entails feature tracking, where the field of view is subdivided into small windows which are tracked over the cardiac cycle to generate estimates of displacement and velocity. However, myocardial voxels as assessed by MRI are largely homogeneous and may be confounded by contaminating signal originating from blood flow, rendering feature-tracking difficult. There is also considerable variability of strain estimates between feature-tracking software vendors. Alternatively, myocardial strain or strain rate may be directly measured using dedicated pulse sequences, such as Spatial Modulation of Magnetization (SPAMM), Displacement Encoding with Stimulated Echoes (DENSE), and phase-contrast MRI. However, these pulse sequences require advanced technical expertise and are not widely available.

As described in the previous examples, CNNs have untapped potential to extrapolate beyond simple visual tasks and learn fluid-mechanical relationships to synthesize blood flow fields from routine anatomic cardiac MRI. Based on its effectiveness in other tasks, the trifurcated Triton-Net architecture should be similarly effective in inferring myocardial velocities from cine SSFP images, using 4D Flow MRI velocity fields as ground truth training data.

Figure 12:
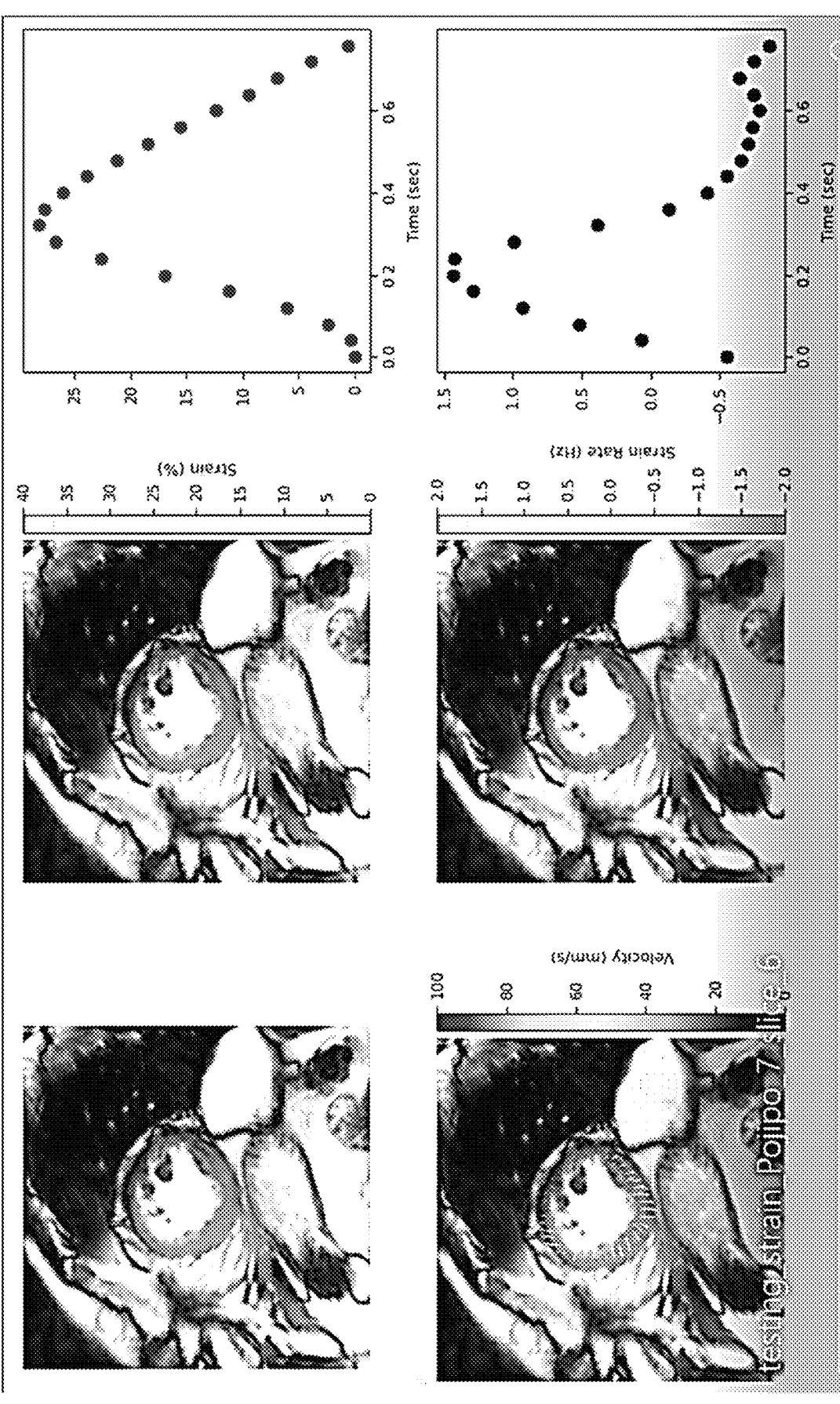
FIG. 12 shows the results of training Triton-Net to simultaneously segment cardiac chambers, locate anatomical landmarks, and synthesize myocardial velocity fields, with the results of further computation of the myocardial strain rate and strain.

For testing, Triton-Net CNN was retrained to simultaneously segment cardiac chambers, locate anatomical landmarks, and synthesize myocardial velocity fields. FIG. 12 shows the results of training the Triton-Net hybrid CNN to simultaneously segment cardiac chambers, locate anatomical landmarks, and synthesize myocardial velocity fields. From these outputs, the myocardial strain rate can be computed by taking the spatial gradient of the inferred velocity field; subsequently, strain may be calculated by temporally integrating the strain-rate.

The examples described herein demonstrate the ability of the inventive CNN architecture to extrapolate beyond the straightforward visual tasks of localization and segmentation. Specifically, Triton-Net can learn to synthesize the outflow blood velocity field from routine cine SSFP cardiac MR images. CNNs that can infer such information may provide additional hemodynamic insights retrospectively for patients who undergo routine cardiac MR imaging. Similar strategies enable convolutional neural networks to perform a wide range of complex tasks that require extrapolation of pathophysiology beyond what is anatomically visible.

The invention claimed is:

1. A method for analysis of time series images from an image source, the method comprising:

inputting the time series images into a computer processor configured to execute a 3D-UNet convolutional neural network (CNN) and multiple sub-convolutional neural network output prongs based on an SRNet architecture, wherein the computer processor:

generates spatiotemporal feature maps from the time series images; and receives and distributes the feature maps to the multiple output prongs to simultaneously and in parallel generate a plurality of different inferences including image segmentation, regression of values, and multi-landmark localization.

2. The method of claim 1, wherein the 3D-UNet architecture comprises a 3D encoder-decoder block, a 3D-to-2D convolutional block, and a resolution scaling layer.

3. The method of claim 1, wherein each output prong comprises a squeeze-and-excitation block and a 2D convolution block.

4. The method of claim 1, wherein the time series images comprise a cine balanced steady-state free precession (SSFP) cardiac series, the multiple sub-convolutional neural network output prongs comprise three prongs, and wherein image segmentation comprises delineating edges of cardiac chambers, regression of values comprises synthesis of blood flow or myocardial velocity field, and multi-landmark localization comprises localization of valves and apex.

5. The method of claim 4, further comprising a post-processing block configured combine inferences image segmentation, regression of values, and multi-landmark localization inference and to compute estimates for one or more of outflow gradients and maximum wall thickness.

6. The method of claim 5, wherein estimates of outflow gradients are calculated using the modified Bernoulli equation, $\Delta P = 4v2$, where v is the peak speed.

7. The method of claim 5, wherein estimates of maximum wall thickness are calculated by defining a mitral valve-apex axis and slicing an end-diastolic myocardial mask orthogonally to the axis.

8. The method of claim 4, further comprising a post-processing block configured for computing a spatial gradient of the myocardial velocity field to determine a myocardial strain rate.

9. The method of claim 8, wherein the post-processing block further calculates strain by temporally integrating the strain rate.

10. A method for analysis of time series images, the method comprising:

receiving the time series images in a computer processor configured for executing a trained 3D-UNet convolutional neural network (CNN) and generating spatiotemporal feature maps therefrom; and distributing the feature maps to multiple sub-convolutional neural network output prongs based on an SRNet architecture for simultaneously and in parallel generating a plurality of different inferences comprising a first prong configured to generate inferences for image segmentation, a second prong configured to generates inferences for regression of values, and a third prong configured to generate inferences for multi-landmark localization.

11. The method of claim 10, wherein the 3D-UNet architecture comprises a 3D encoder-decoder block, a 3D-to-2D convolutional block, and a resolution scaling layer.

12. The method of claim 10, wherein each output prong comprises a squeeze-and-excitation block and a 2D convolution block.

13. The method of claim 10, wherein the time series images comprise a cine balanced steady-state free precession (SSFP) cardiac series, the multiple sub-convolutional neural network output prongs comprise three prongs, and wherein image segmentation comprises delineating edges of cardiac chambers, regression of values comprises synthesis of blood flow or myocardial velocity field, and multi-landmark localization comprises localization of valves and apex.

14. The method of claim 13, further comprising combining and post-processing the inferences and computing estimates for one or more of outflow gradients and maximum wall thickness.

15. The method of claim 14, wherein estimates of outflow gradients are calculated using the modified Bernoulli equation, $\Delta P = 4v2$, where v is the peak speed.

16. The method of claim 14, wherein estimates of maximum wall thickness are calculated by defining a mitral valve-apex axis and slicing an end-diastolic myocardial mask orthogonally to the axis.

17. The method of claim 13, further comprising computing a spatial gradient of the myocardial velocity field to determine a myocardial strain rate.

18. The method of claim 17, further comprising calculating strain by temporally integrating the strain rate.

* * * * *